US011721360B2

(12) United States Patent
Kataguchi et al.

(10) Patent No.: US 11,721,360 B2
(45) Date of Patent: *Aug. 8, 2023

(54) MAGNETIC RECORDING MEDIUM

(71) Applicant: Sony Corporation, Tokyo (JP)

(72) Inventors: Takashi Kataguchi, Tokyo (JP); Natsuki Ichise, Tokyo (JP); Takeshi Takahashi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/528,900

(22) Filed: Nov. 17, 2021

(65) Prior Publication Data

US 2022/0076699 A1 Mar. 10, 2022

Related U.S. Application Data

(63) Continuation of application No. 17/257,461, filed as application No. PCT/JP2020/025767 on Jul. 1, 2020, now Pat. No. 11,183,213.

(30) Foreign Application Priority Data

Jan. 20, 2020 (JP) .................... 2020-006553

(51) Int. Cl.
*G11B 5/008* (2006.01)
*G11B 5/706* (2006.01)
(Continued)

(52) U.S. Cl.
CPC ...... *G11B 5/70678* (2013.01); *G11B 5/00817* (2013.01); *G11B 5/714* (2013.01);
(Continued)

(58) Field of Classification Search
CPC ..... G11B 15/43; G11B 5/00817; G11B 5/584; G11B 5/588; G11B 5/70678; G11B 5/714; G11B 5/735; G11B 5/73929
See application file for complete search history.

(56) References Cited

U.S. PATENT DOCUMENTS 6,451,220 B1   9/2002   Ziolo et al.
6,773,788 B2   8/2004   Mori et al.
(Continued)

FOREIGN PATENT DOCUMENTS

JP   2014-170604 A   9/2014
JP   6610828 B1   11/2019
(Continued)

*Primary Examiner* — Holly Rickman
*Assistant Examiner* — Linda N Chau
(74) *Attorney, Agent, or Firm* — K&L Gates LLP

(57) ABSTRACT

The present disclosure provides where a magnetic recording medium is provided and includes a base; an underlayer that is provided over the base and includes a non-magnetic powder; and a magnetic layer that is provided over the underlayer and includes a magnetic powder and a binder, wherein an average particle volume V of the magnetic powder is 1600 nm$^3$ or less, an average thickness of the magnetic recording medium is 5.3 μm or less, a thermal stability $K_u V_{act}/k_B T$ of the magnetic recording medium is 63 or more, and a ratio Hrp/Hc1 of a residual coercive force Hrp of the magnetic recording medium measured using a pulsed magnetic field in a perpendicular direction to a coercive force Hc1 of the magnetic recording medium in the perpendicular direction is 1.98 or less.

20 Claims, 8 Drawing Sheets

(51) Int. Cl.
  *G11B 5/714* (2006.01)
  *G11B 5/735* (2006.01)
  *G11B 5/584* (2006.01)
  *G11B 5/588* (2006.01)
  *G11B 15/43* (2006.01)

(52) U.S. Cl.
  CPC .............. *G11B 5/735* (2013.01); *G11B 5/584* (2013.01); *G11B 5/588* (2013.01); *G11B 15/43* (2013.01)

(56) References Cited

U.S. PATENT DOCUMENTS

| | | |
|---|---|---|
| 6,994,925 B2 | 2/2006 | Masaki et al. |
| 7,502,188 B2 | 3/2009 | Inomata et al. |
| 8,681,451 B2 | 3/2014 | Harasawa et al. |
| 10,748,570 B2 | 8/2020 | Terakawa et al. |
| 10,796,724 B1 | 10/2020 | Nakashio et al. |
| 2014/0247520 A1 | 9/2014 | Yang et al. |
| 2014/0295214 A1* | 10/2014 | Tada .................. G11B 5/70615 423/632 |
| 2021/0012800 A1 | 1/2021 | Yamaga et al. |

FOREIGN PATENT DOCUMENTS

| | | |
|---|---|---|
| JP | 6635220 B1 | 1/2020 |
| JP | 6635224 B1 | 1/2020 |
| JP | 6645613 B1 | 2/2020 |

* cited by examiner

MAGNETIC RECORDING MEDIUM

TECHNICAL FIELD

The present disclosure relates to a magnetic recording medium.

BACKGROUND ART

For example, with the development of IoT, big data, and artificial intelligence, the amount of data collected and stored has increased significantly. A magnetic recording medium is often used as a medium for recording a large amount of data.

With respect to a magnetic recording medium, various technologies have been proposed so far. For example, as a technology on a magnetic powder contained in a magnetic recording medium, the following Patent Literature 1 discloses a magnetic recording medium including at least a magnetic layer formed by applying a magnetic coating material containing a ferromagnetic powder and a binder on a non-magnetic support, the magnetic recording medium being characterized in that the magnetic layer contains an aromatic compound in an amount of 0.4 [parts by weight] to 10 [parts by weight] on the basis of 100 [parts by weight] of the ferromagnetic powder, the aromatic compound having a carboxyl group and at least one or more hydroxyl groups in the molecule and having a fused ring in the case where the number of aromatic rings is two or more.

CITATION LIST

Patent Literature

Patent Literature 1: Japanese Patent Application Laid-open No. 2002-373413

DISCLOSURE OF INVENTION

Technical Problem

In order to enhance the recording density of the magnetic recording medium, it is conceivable to reduce the particle volume of the magnetic powder contained in the magnetic recording medium. However, as the particle volume of the magnetic powder becomes smaller, the preservation stability of the magnetic recording medium decreases. This reduction in preservation stability can be problematic, particularly in the case where the magnetic recording medium is preserved for extended periods of time.

In this regard, it is a main object of the present disclosure to provide a magnetic recording medium having excellent preservation stability even in the case where the particle volume of the magnetic powder is small.

Solution to Problem

The present disclosure provides a tape-shaped magnetic recording medium including: a base; and a magnetic layer that is provided on the base and contains a magnetic powder, in which an average particle volume V of the magnetic powder is 2,000 nm$^3$ or less, an average thickness of the magnetic recording medium is 5.3 μm or less, a thermal stability $K_u V_{act}/k_B T$ of the magnetic recording medium is 60 or more, and a ratio Hrp/Hc1 of a residual coercive force Hrp of the magnetic recording medium measured using a pulsed magnetic field to a coercive force Hc1 of the magnetic recording medium in a perpendicular direction is 2.10 or less.

The average particle volume V of the magnetic powder may be 1,800 nm$^3$ or less.

The average particle volume V of the magnetic powder may be 1,600 nm$^3$ or less.

The thermal stability $K_u V_{act}/k_B T$ may be 63 or more.

The thermal stability $K_u V_{act}/k_B T$ may be 65 or more.

The ratio Hrp/Hc1 may be 2.05 or less.

The ratio Hrp/Hc1 may be 2.00 or less.

The magnetic powder may contain hexagonal ferrite.

The hexagonal ferrite may contain at least one of Ba or Sr.

A signal attenuation amount SD of the magnetic recording medium at 100 seconds after recording may satisfy the following relationship: −0.30 dB≤SD.

The signal attenuation amount SD of the magnetic recording medium at 100 seconds after recording may satisfy the following relationship: −0.25 dB≤SD.

A thickness $t_m$ of the magnetic layer may satisfy the following relationship: 30 nm≤$t_m$≤90 nm.

The coercive force Hc1 may be 500 Oe or more.

An average thickness of the base may be 4.2 μm or less.

An underlayer may be provided between the magnetic layer and the base, and an average thickness of the underlayer may be 2.0 μm or less.

Of two surfaces of the base, a back layer may be provided on a surface opposed to a surface on which the magnetic layer is provided, and an average thickness of the back layer may be 0.6 μm or less.

An average particle size of the magnetic powder may be 50 nm or less.

The present disclosure also provides a tape cartridge including:

the magnetic recording medium;

a communication unit that communicates with a recording/reproduction apparatus;

a storage unit; and a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, in which the information includes adjustment information for adjusting tension applied to the magnetic recording medium in a longitudinal direction.

MODE(S) FOR CARRYING OUT THE INVENTION

Figure 1:
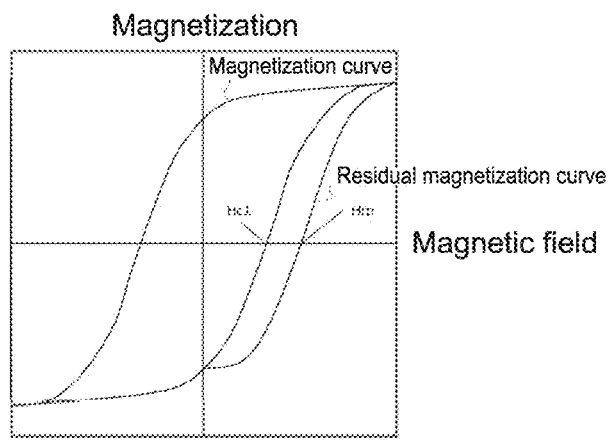
FIG. 1 is a diagram showing an example of a magnetization curve and a residual magnetization curve.

Hereinafter, a favorable embodiment for carrying out the present disclosure will be described. Note that the embodiment described below shows a typical embodiment of the present disclosure, and the scope of the present disclosure is not limited to only these embodiments.

The present disclosure will be described in the following order.
1. Description of present disclosure
2. Embodiment (example of coating-type magnetic recording medium)
(1) Configuration of magnetic recording medium
(2) Method of producing magnetic recording medium
(3) Recording/reproduction apparatus
(4) Cartridge
(5) Effects
(6) Modified example
3. Example

1. Description of Present Disclosure

A magnetic recording medium according to the present disclosure includes: a magnetic layer containing a magnetic powder having a particular particle volume, in which an average thickness and a thermal stability $K_u V_{act}/k_B T$ are within particular numerical ranges, and a ratio Hrp/Hc1 of a residual coercive force Hrp of the magnetic recording medium measured using a pulsed magnetic field to a coercive force Hc1 of the magnetic recording medium in the perpendicular direction is within a particular numerical range. As a result, the magnetic recording medium according to the present disclosure has excellent preservation stability even though the particle volume of the magnetic powder is small. In addition, the magnetic recording medium according to the present disclosure has excellent electromagnetic conversion characteristics. The thermal stability $K_u V_{act}/k_B T$ and the residual coercive force Hrp will be described in more detail below.

The smaller the particle volume of the magnetic powder contained in the magnetic recording medium, the higher the recording density and even the better the electromagnetic conversion characteristics. However, when the particle volume is smaller, the magnetization recorded in the magnetic recording medium (specifically, the magnetic layer) is likely to be lost by thermal energy, which may result in attenuation of the data signal. Thus, as the particle volume of the magnetic powder contained in the magnetic recording medium becomes smaller, the stability of the magnetic recording medium to heat (referred to also as thermal stability) may be reduced and the preservation stability of the magnetic recording medium may be reduced. Further, when the thermal stability is to be maintained, it becomes difficult to easily rewrite information. Thus, while the reduction in the particle volume of the magnetic powder results in improved recording density and improved electromagnetic conversion characteristics, this leads to a decrease in preservation stability and also makes rewriting of information difficult in some cases.

The relationship between the thermal stability and the coercive force of the magnetic recording medium can be expressed by the Bean's equation shown below.

Bean's equation $H_c = (2K_u/M)(1-5k_B T/K_u V_{act})^{0.5}$ (Math. 1)

In the equation, $V_{act}$=the activation volume of the magnetic powder contained in the magnetic recording medium, $H_c$=the coercive force, $K_u$=the magnetocrystalline anisotropy, M=the magnetization volume, $k_B$=the Boltzmann constant, and T=Temperature.

$K_u V_{act}/k_B T$ composed of parameters included in this equation is known as an index value of thermal stability. The higher the value, the higher the thermal stability. As can be seen from the thermal stability $K_u V_{act}/k_B T$, miniaturization of the magnetic powder, i.e. reduction in the particle volume of the magnetic powder, results in a reduction in thermal stability. The reduction in thermal stability leads to a reduction in the preservation stability of the magnetic recording medium. This is particularly problematic in the case where the magnetic recording medium is preserved for an extended period of time.

The magnetic recording medium according to the present disclosure has a thermal stability $K_u V_{act}/k_B T$ of 60 or more, favorably 63 or more, more favorably 65 or more, and still more favorably 70 or more. The magnetic recording medium according to the present disclosure is excellent in thermal stability by having the thermal stability $K_u V_{act}/k_B T$ within the above-mentioned numerical range, and thus is excellent in preservation stability and also excellent in stability in long-term preservation. Further, the magnetic recording medium is also superior from the viewpoint of output signals.

Further, the residual coercive force Hrp, particularly, the ratio Hrp/Hc1 of the residual coercive force Hrp to the coercive force Hc1 of the magnetic recording medium in the perpendicular direction, also contributes to improvement in preservation stability of the magnetic recording medium having a small average particle volume of the magnetic powder.

The residual coercive force Hrp will be described below with reference to FIG. 1.

The coercive force Hc1 in the perpendicular direction is an index that has been used in the past. In order to measure this, for example, an M-H loop (magnetization curve) is created on the basis of the measurement result by a magnetometer. An example of the M-H loop is shown in FIG. 1. As shown in FIG. 1, the magnetic field at a position where the M-H loop crosses the X-axis (magnetic field) is the coercive force Hc1. The field sweep rate used for this measurement is slow.

Unlike measurement of the coercive force Hc1, the residual coercive force Hrp is measured using a pulsed magnetic field. That is, the measurement is performed using a fast field sweep rate. In the measurement, a magnetization curve is generated on the basis of the magnetization volume obtained by using the pulsed magnetic field. The magnetization curve is referred to as a residual magnetization curve. An example of the residual magnetization curve is also shown in FIG. 1. The magnetic field at a position where the residual magnetization curve crosses the X-axis (magnetic field) is indicated by "Hrp" in FIG. 1, and the magnetic field is a residual coercive force.

The present inventors have found that the thermal stability of the magnetic recording medium is improved when the difference between the coercive force Hc1 and the residual coercive force Hrp is small, more specifically, when the ratio Hrp/Hc1 between the residual coercive force Hrp and the coercive force Hc1 is within a particular numerical range, Note that the residual coercive force Hrp is measured using a fast field sweep rate as described above. This fast field sweep rate is closer to the magnetic field applied in recording by the magnetic recording medium than the slow field sweep rate used in measuring the coercive force Hc1. Also from this viewpoint, the residual coercive force Hrp is considered to be a valuable index.

The ratio Hrp/Hc1 of the residual coercive force Hrp to the coercive force Hc1 of the magnetic recording medium according to the present disclosure is 2.10 or less, favorably 2.05 or less, more favorably 2.00 or less, and still more favorably 1.95 or less, 1.90 or less, or 1.85 or less. When the above-mentioned ratio Hrp/Hc1 is within the above-mentioned numerical range, the magnetic recording medium according to the present disclosure has excellent preservation stability, thereby making it possible to prevent signal-attenuation during long-term preservation, for example. Further, when the ratio Hrp/Hc1 is within the above-mentioned numerical range, recording and reproduction can be stably performed even if the average particle volume of the magnetic powder contained in the magnetic recording medium is low.

Further, an average particle volume V of the magnetic powder included in the magnetic recording medium according to the present disclosure is 2,000 $nm^3$ or less, favorably 1,900 $nm^3$ or less, more favorably 1,800 $nm^3$ or less, and still more favorably 1,700 $nm^3$ or less, 1,600 $nm^3$ or less, or 1,500 $nm^3$ or less. When the average particle volume is within the above-mentioned numerical range, the electromagnetic conversion characteristics is improved. Despite the very low average particle volume of the magnetic powder contained in the magnetic recording medium according to the present disclosure, the magnetic recording medium according to the present disclosure has excellent preservation stability as described above. Although it is difficult to achieve both electromagnetic conversion characteristics and preservation stability, both electromagnetic conversion characteristics and preservation stability can be improved by the present disclosure.

The signal attenuation amount SD at 100 seconds after recording by the magnetic recording medium according to the present disclosure satisfies the following relationship: favorably $-0.30$ dB$\leq$SD, more favorably $-0.25$ dB$\leq$SD, and still more favorably $-0.20$ dB$\leq$SD, $-0.15$ dB$\leq$SD, or $-0.10$ dB$\leq$SD. The signal attenuation amount SD at 100 seconds after recording data by the magnetic recording medium according to the present disclosure may be low as described above. Therefore, the magnetic recording medium according to the present disclosure is excellent in data preservation stability and also excellent in data preservation stability over a long period of time. The method of measuring the signal attenuation amount SD is described hereinbelow. It can be seen that the signal attenuation amount SD is an index of long-term preservation stability, because it is extrapolated in logarithmic plots when calculating the signal attenuation as described in this description.

The signal attenuation amount SD at 100 seconds after the recording by the magnetic recording medium according to the present disclosure may satisfy the relationship of, for example, SD$\leq$0.

An average thickness $t_T$ of the magnetic recording medium according to the present disclosure is favorably 5.3 µm or less, more favorably 5.2 µm or less, and still more favorably 5.1 µm or less, 5.0 µm or less, 4.8 µm or less, or 4.6 µm or less. The magnetic recording medium according to the present disclosure may thus be thin in total thickness. By reducing the total thickness of the magnetic recording medium according to the present disclosure in this way, for example, the length of the tape to be wound in one magnetic recording cartridge can be made longer, thereby increasing the recording capacity per one magnetic recording cartridge. In other words, in addition to improving electromagnetic conversion characteristics and preservation stability, the recording capacity can be improved by the present disclosure.

The width of the magnetic recording medium according to the present disclosure may be, for example, from 5 mm to 30 mm, particularly from 7 mm to 25 mm, more particularly from 10 mm to 20 mm, and still more particularly from 11 mm to 19 mm. The length of the tape magnetic recording medium according to the present disclosure may be, for example, from 500 m to 1500 m. For example, the width of the tape according to the LTO8 standard is 12.65 mm and the length of the tape is 960 m.

The magnetic recording medium according to the present disclosure has a tape shape and can be, for example, an elongated magnetic recording tape. The tape-like magnetic recording medium according to the present disclosure may be housed in, for example, a magnetic recording cartridge. More specifically, it may be housed in the cartridge while being wound on a reel in the magnetic recording cartridge.

In a favorable embodiment of the present disclosure, the magnetic recording medium according to the present disclosure may include a magnetic layer, an underlayer, a base (referred to also as a base layer), and a back layer. These four layers may be stacked in this order. The magnetic recording medium according to the present disclosure may include other layers in addition to these layers. The other layers may be appropriately selected in accordance with the type of the magnetic recording medium. The magnetic recording medium according to the present disclosure may be, for example, a coating-type magnetic recording medium. The coating-type magnetic recording medium will be described in more detail in the section 2. below.

2. Embodiment (Example of Coating-Type Magnetic Recording Medium)

(1) Configuration of Magnetic Recording Medium

Figure 2:
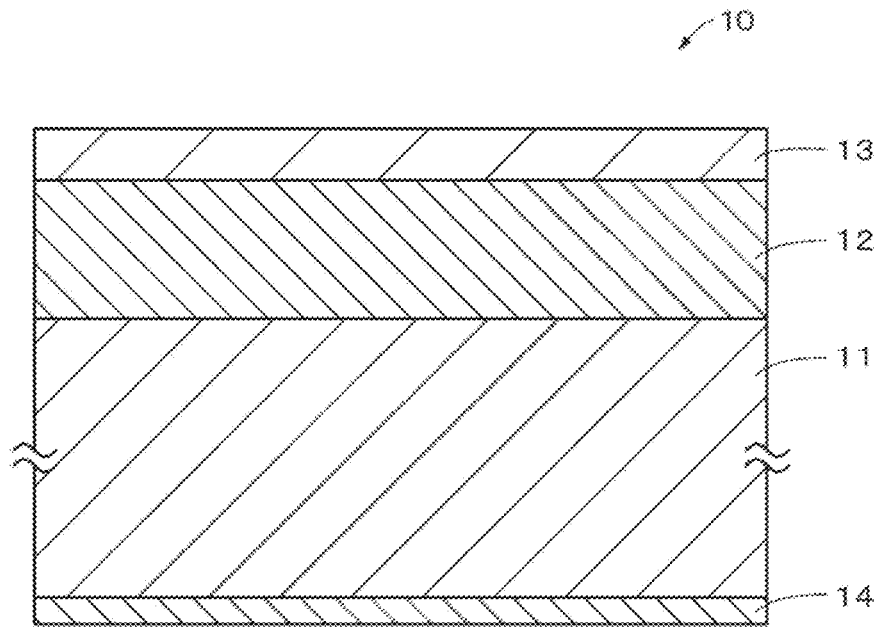
FIG. 2 is a cross-sectional view of a magnetic recording medium according to an embodiment of the present disclosure.

First, a configuration of a magnetic recording medium 10 according to an embodiment will be described with reference to FIG. 2. The magnetic recording medium 10 includes an elongated base 11, an underlayer 12 provided on one main surface of the base 11, a magnetic layer 13 provided on the underlayer 12, and a back layer 14 provided on the other main surface of the base 11. Note that the underlayer 12 and the back layer 14 are provided as necessary and do not necessarily need to be provided.

The magnetic recording medium 10 has a long tape-like shape, and is caused to travel in a longitudinal direction during recording and reproduction. Note that the surface of the magnetic layer 13 is the surface on which the magnetic head is caused to travel. The magnetic recording medium 10 is favorably used in a recording/reproduction apparatus including a ring-type head as a recording head. Note that in this specification, the "perpendicular direction" means a direction perpendicular to the surface of the magnetic recording medium 10 (the thickness direction of the magnetic recording medium 10), and the "longitudinal direction" means a longitudinal direction (traveling direction) of the magnetic recording medium 10.

(Base)

The base 11 is a non-magnetic support that supports the underlayer 12 and the magnetic layer 13. The base 11 has a long film-like shape. The average thickness of the base 11 is favorably 4.2 µm or less, more favorably 3.8 µm or less, and still more favorably 3.4 µm or less. When the average thickness of the base 11 is 4.2 µm or less, the recording capacity in one data cartridge can be increased as compared with a typical magnetic recording medium. The average thickness of the base 11 is favorably 3 µm or more, and more favorably 3.2 µm or more. When the average thickness of the base 11 is 3 µm or more, a decrease in the intensity of the base 11 can be suppressed.

The average thickness of the base 11 is obtained as follows. First the magnetic recording medium 10 having a ½ inch width is prepared and cut into a length of 250 mm to prepare a sample. Subsequently, layers other than the base 11 of the sample (i.e., the underlayer 12, the magnetic layer 13, and the back layer 14) are removed with a solvent such as MEK (methyl ethyl ketone) and dilute hydrochloric acid. Next, using a laser hologage (LGH-110C) manufactured by Mitutoyo Corporation as a measuring device, the thickness of the sample (the base 11) is measured at five or more points, and the measured values are simply averaged (arithmetically averaged) to calculate the average thickness of the base 11. Note that the measurement positions are randomly selected from the sample.

The base 11 contains, for example, at least one of polyesters, polyolefins, cellulosic derivatives, vinyl resins, and different polymer resins. In the case where the base 11 contains two or more of the above-mentioned materials, the two or more materials may be mixed, copolymerized, or stacked.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), and CAP (cellulose acetate propionate). The vinyl resins include, for example, at least one of PVC (polyvinyl chloride) or PVDC (polyvinylidene chloride).

The different polymer resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), polyether ester, PES (polyethersulfone), PEI (polyether imide), PSF (polysulfone), PPS (polyphenylene sulfide), PC (polycarbonate), PAR (polyarylate), or PU (polyurethane).

The base 11 contains, for example, a polyester as a main component. The polyester may be, for example, one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), and polyethylene bisphenoxycarboxylate, or a mixture of two or more of them. In this specification, the "main component" means that the component is the component having the highest content ratio among the components forming the base. For example, the main component of the base 11 being polyester may mean that the content ratio of the polyester in the base 11 is, for example, 50 mass % or more, 60 mass % or more, 70 mass % or more, 80 mass % or more, 90 mass % or more, 95 mass % or more, or 98 mass % or more on the basis of the mass of the base layer 11, or that the base layer 11 is formed of only polyester.

In this embodiment, the base 11 may contain, in addition to the polyester, a resin described below other than the polyester.

In accordance with a favorable embodiment of the present technology, the base 11 may be formed of PET or PEN.

(Magnetic Layer)

The magnetic layer 13 is a recording layer for recording signals. The magnetic layer 13 includes, for example, a magnetic powder and a binder. The magnetic layer 13 may further contain, as necessary, at least one additive of a lubricant, an antistatic agent, an abrasive, a curing agent, a rust inhibitor, non-magnetic reinforcing particles, and the like.

Figure 3:
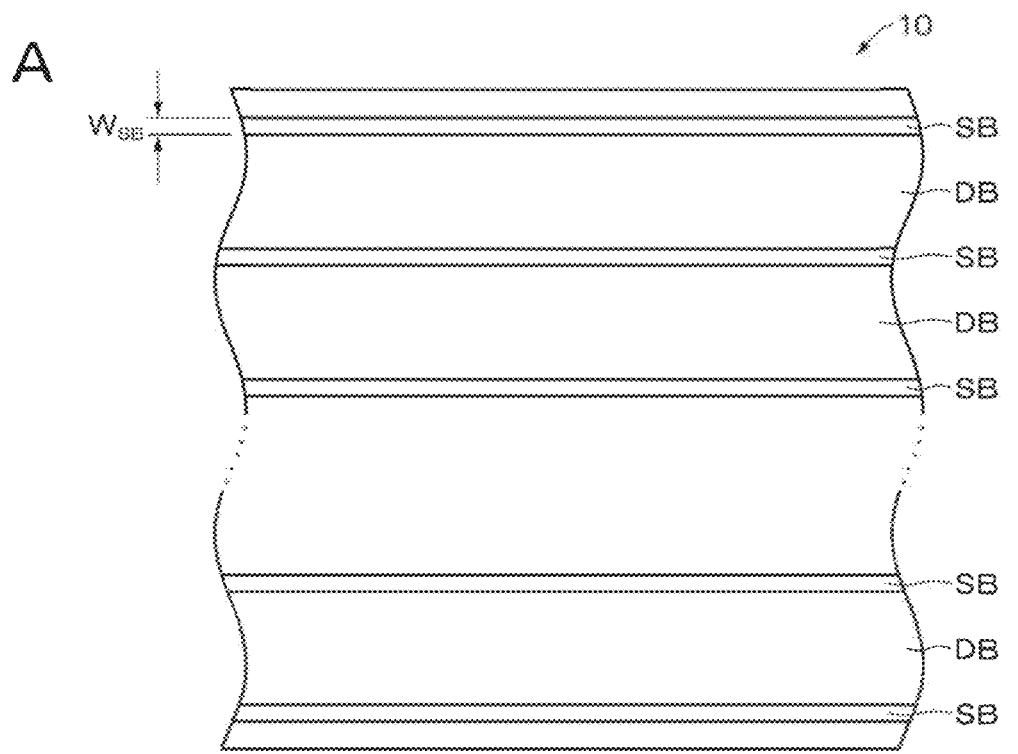
FIG. 3 Part A of FIG. 3 is a schematic diagram showing the layout of a data band and a servo band. Part B of FIG. 3 is an enlarged view of the data band.
Figure 3:
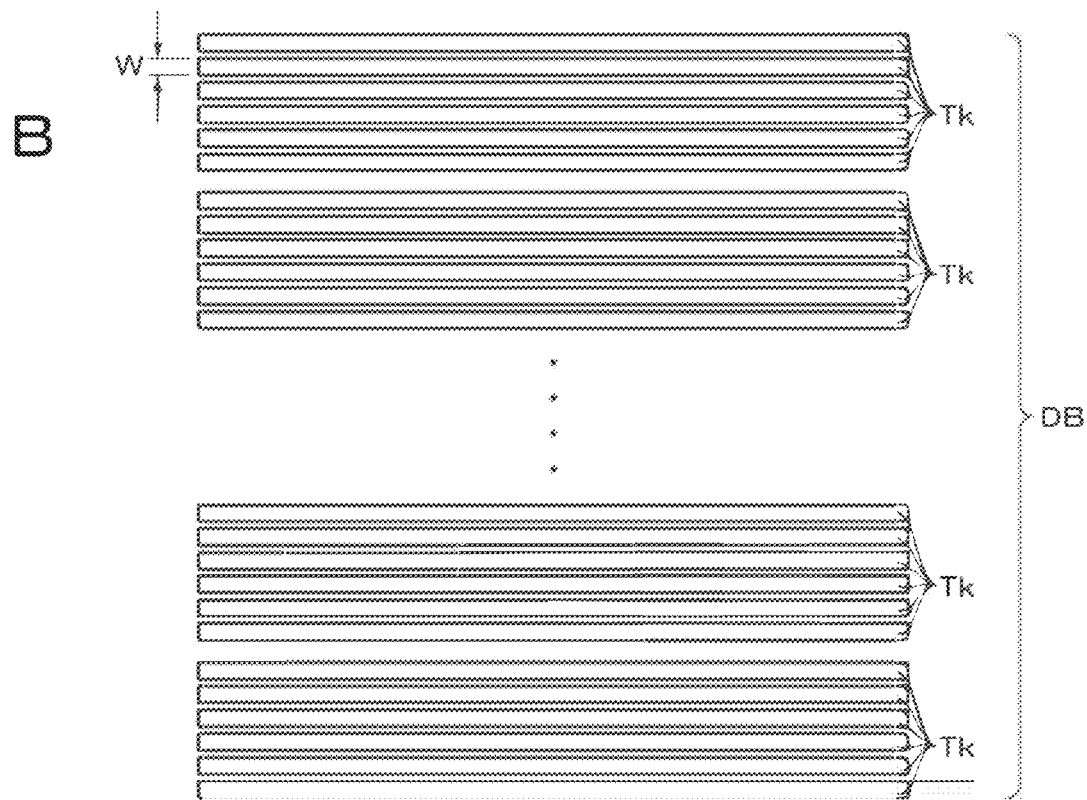

It is favorable that the magnetic layer 13 includes a plurality of servo bands SB and a plurality of data bands DB in advance as shown in Part A of FIG. 3. The plurality of the servo bands SB is provided at equal intervals in the width direction of the magnetic recording medium 10. The data band DB is provided between adjacent servo bands SB. A servo signal for controlling the tracking of the magnetic head is written to the servo band SB in advance. User data is recorded on the data band DB.

From the viewpoint of ensuring high recording capacity, a ratio $R_S$ ($=(S_{SB}/S)$ 100) of a total area $S_{SB}$ of the servo bands SB to an area S of the surface of the magnetic layer 13 is favorably 4.0% or less, more favorably 3.0% or less, and still more favorably 2.0% or less. Meanwhile, from the viewpoint of ensuring five or more servo tracks, the ratio $R_S$ of the total area $S_{SB}$ of the servo bands SB to the area S of the surface of the magnetic layer 13 is favorably 0.8% or more.

The ratio $R_S$ of the total area $S_{SB}$ of the servo bands SB to the area S of the entire surface of the magnetic layer 13 is obtained as follows. For example, the magnetic recording medium 10 is developed using a ferricolloid developer (SigMarker Q manufactured by Sigma Hi Chemical Inc.), and the developed magnetic recording medium 10 is then observed under an optical microscope to measure a servo band width $W_{SB}$ and the number of servo bands SB. Next, the ratio $R_S$ is obtained from the following formula.

Ratio $R_S$ [%]=(((servo band width $W_{SB}$)×(number of servo bands))/(width of magnetic recording medium 10))×100

The number of servo bands SB is favorably 5 or more, more favorably 5+4n (however, n is a positive integer.) or more, and still more favorably 9+4n or more. When the number of servo bands SB is 5 or more, the effect on the servo signal due to the dimensional change of the magnetic recording medium 10 in the width direction can be suppressed, and stable recording/reproduction characteristics with less off-track can be ensured. The number of servo bands SB is not particularly limited, but is, for example, 33 or less.

The number of servo bands SB can be checked as follows. First, the surface of the magnetic layer 13 is observed using a magnetic force microscope (MFM) to obtain an MFM image. Next, the number of servo bands SB is counted using the MFM image.

The servo band width $W_{SB}$ is favorably 95 μm or less, more favorably 60 μm or less, and still more favorably 30 μm or less from the viewpoint of ensuring high recording capacity. The servo band width $W_{SB}$ is favorably 10 μm or more. The production of a recording head capable of reading the servo signal of the servo band width $W_{SB}$ less than 10 μm is challenging.

The servo band width $W_{SB}$ is obtained as follows. First, the surface of the magnetic layer 13 is observed using a magnetic force microscope (MFM) to obtain an MFM image. Next, the servo band width $W_{SB}$ is measured using the MFM image.

As shown in Part B of FIG. 3, the magnetic layer 13 is configured to be capable of forming a plurality of data tracks Tk on the data band DB. From the viewpoint of ensuring high recording capacity, a data track width W is favorably 2.0 μm or less, more favorably 1.5 μm or less, and still more favorably 1.0 μm or less. The data track width W is favorably 0.02 μm or more.

The data track width W is obtained as follows. For example, data recording patterns of data band portions of the magnetic layer 13 in which data is recorded on the entire surface are observed using a magnetic force microscope (MFM) to obtain an MFM image. Dimension 3100 manufactured by Digital Instruments and the analysis software thereof are used as the MFM. The measurement region of the MFM image is 10 μm×10 nm, and the measurement region of 10 μm×10 μm is divided into 512×512 (=262,144) measurement points. The measurement by MFM is performed on three 10 μm×10 μm measurement regions with different locations, i.e. three MFM images are obtained. From the three obtained MFM images, the track widths are measured at 10 locations using the analysis software attached to Dimension 3100, and the average value thereof (which is a simple average) is obtained. The obtained average value is the data track width W. Note that the measurement conditions of the MFM are as follows: sweep rate: 1 Hz, chip used: MFMR-20, lift height: 20 nm, and correction: Flatten order 3.

The magnetic layer 13 is configured to be capable of recording data so that a minimum value L of the magnetization reversal distance and the data track width W satisfy the following relationship: favorably W/L≤200, more favorably W/L≤60, still more favorably W/L≤45, and particularly favorably W/L≤30. When the minimum value L of the magnetization reversal distance is a constant value and the minimum value L of the magnetization reversal distance and the track width W satisfy the following relationship: W/L>200 (i.e., when the track width W is large), since the track recording density does not increase, there is a possibility that recording capacity cannot be sufficiently ensured. Further, when the track width W is a constant value and the minimum value L of the magnetization reversal distance and the track width W satisfy the following relationship: W/L>200 (i.e., when the minimum value L of the magnetization reversal distance is small), there is a possibility that the SNR is significantly deteriorated due to the effect of spacing loss although the bit length is reduced and the line recording density is increased. Therefore, in order to suppress the deterioration of the SNR while ensuring the recording capacity, it is favorable that W/L is in the range of W/L≤60 as described above. However, W/L is not limited to the above-mentioned range, and may satisfy the following relationship: W/L≤23 or W/L≤13. The lower limit value of W/L is not particularly limited, but is, for example, 1≤W/L.

From the viewpoint of ensuring high recording capacity, the magnetic layer 13 is configured to be capable of recording data so that the minimum value L of the magnetization reversal distance is favorably 55 nm or less, more favorably 53 nm or less, still more favorably 52 nm or less, 50 nm or less, 48 nm or less, or 44 nm, and particularly favorably 40 nm or less. The lower limit value of the minimum value L of the magnetization reversal distance is favorably 20 nm or more in view of the magnetic particle size. The minimum value L of the magnetization reversal distance is taken into account by the magnetic particle size.

The minimum value L of the magnetization reversal distance is obtained as follows. For example, data recording patterns of data band portions of the magnetic layer 13 in which data is recorded on the entire surface are observed using a magnetic force microscope (MFM) to obtain an MFM image. Dimension 3100 manufactured by Digital Instruments and the analysis software thereof are used as the MFM. The measurement region of the MFM image is 2 μm×2 μm, and the measurement region of 2 μm×2 μm is divided into 512×512 (=262,144) measurement points. The measurement by MFM is performed on three 2 μm×2 μm measurement regions with different locations, i.e. three MFM images are obtained. Fifty bit-to-bit distances are measured from the two-dimensional uneven chart of the recording pattern of the obtained MFM image. The bit-to-bit distances are measured using the analysis software attached to Dimension 3100. The value that becomes approximately the greatest common divisor of the measured 50 bit-to-bit distances is defined as the minimum value L of the magnetization reversal distance. Note that the measurement conditions are as follows: sweep rate: 1 Hz, chip used: MFMR-20, lift height: 20 nm, and correction: Flatten order 3.

An average thickness $t_m$ of the magnetic layer 13 is favorably 90 nm or less, particularly favorably 80 nm or less, more favorably 70 nm or less, and still more favorably 50 nm or less. When the average thickness of the magnetic layer 13 is 90 nm or less, since the magnetization can be recorded uniformly in the thickness direction of the magnetic layer 13 in the case where a ring-type head is used as a recording head, the electromagnetic conversion characteristics (e.g., SNRs (Signal-to-Noise Ratio)) can be improved.

The average thickness $t_m$ of the magnetic layer 13 is favorably 30 nm or more, and more favorably 35 nm or more. When the average thickness of the magnetic layer 13 is 30 nm or more, the output can be ensured in the case where an MR-type head is used as a reproduction head, so that the electromagnetic conversion characteristics (e.g., SNR) can be improved.

The numerical range of the average thickness of the magnetic layer 13 may be defined by any of the above-mentioned upper limit value and any of the above-mentioned lower limit value, and may satisfy the following relationship: favorably 30 nm≤$t_m$≤90 nm, 35 nm≤$t_m$≤80 nm, or 35 nm≤$t_m$≤70 nm.

The average thickness of the magnetic layer 13 is obtained, for example, as follows.

The magnetic recording medium 10 is processed by an FIB (Focused Ion Beam) method or the like to obtain a slice. In the case of using the FIB method, a carbon film and a tungsten thin film are formed as a protective film as pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

The above-mentioned cross section of the obtained sliced sample is observed by a transmission electron microscope (TEM) under the following conditions to obtain a TEM image. Note that depending on the type of the device, the magnification and acceleration voltage may be adjusted as appropriate.
Device: TEM (H9000NAR manufactured by Hitachi, Ltd.)
Acceleration voltage: 300 kV
Magnification: 100,000 times Next, the obtained TEM image is used to measure the thickness of the magnetic layer 13 at least 10 positions in the longitudinal direction of the magnetic recording medium 10. The obtained measured values are simply averaged (arithmetically averaged) and the obtained average value is taken as an average thickness [nm] of the magnetic layer 13. Note that the positions at which the measurement is performed are randomly selected from the test pieces.

(Magnetic Powder)

Examples of magnetic particles forming the magnetic powder contained in the magnetic layer 13 include, but are not limited to, hexagonal ferrite, epsilon-type iron oxide (ε-iron oxide), Co-containing spinel ferrite, gamma hematite, magnetite, dichromium dioxide, cobalt-deposited iron oxide, and metal. The magnetic powder may be one of these, or may be a combination of two or more of them. It is favorable that the magnetic powder can contain hexagonal ferrite, ε-iron oxide, or Co-containing spinel ferrite. Particularly favorably, the magnetic powder is hexagonal ferrite. Hexagonal ferrite may particularly favorably contain at least one of Ba or Sr. The ε-iron oxide may particularly favorably contain at least one of Al or Ga. These magnetic particles may be appropriately selected by those skilled in the art on the basis of factors such as the method of producing the magnetic layer 13, the standard of the tape, and the function of the tape.

The shape of the magnetic particles depends on the crystalline structure of the magnetic particles. For example, barium ferrite (BaFe) and strontium ferrite may have a hexagonal plate shape. ε-iron oxide may be spherical. Cobalt ferrite may be cubic. The metal may be spindle-shaped. These magnetic particles are oriented in the process of producing the magnetic recording medium 10.

The average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, and favorably 12 nm or more.

The average aspect ratio of the magnetic powder may be, for example, 1.0 or more and 3.0 or less, and may be 1.0 or more and 2.9 or less.

(Embodiment in which Magnetic Powder Contains Hexagonal Ferrite)

In accordance with a favorable embodiment of the present disclosure, the magnetic powder contains hexagonal ferrite, more particularly a powder of nanoparticles containing hexagonal ferrite (hereinafter, referred to as "hexagonal ferrite particles"). Hexagonal ferrite is favorably hexagonal ferrite having an M-type structure. Hexagonal ferrite has, for example, a hexagonal plate shape or a substantially hexagonal plate shape. Hexagonal ferrite may contain favorably at least one of Ba, Sr, Pb, or Ca, and more favorably at least one of Ba, Sr, or Ca. Hexagonal ferrite may particularly be, for example, one selected from the group consisting of barium ferrite, strontium ferrite, and calcium ferrite, or a combination of two or more of them, and is particularly favorably barium ferrite or strontium ferrite. Barium ferrite may further contain at least one of Sr, Pb, or Ca in addition to Ba. Strontium ferrite may further contain at least one of Ba, Pb, or Ca in addition to Sr.

More specifically, hexagonal ferrite may have an average composition represented by the general formula $MFe_{12}O_{19}$. Here, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the above-mentioned general formula, some Fe may be substituted by other meatal elements.

In the case where the magnetic powder contains a powder of hexagonal ferrite particles, the average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, favorably 12 nm or more, and more favorably 15 nm or more. For example, the average particle size of the magnetic powder may be 10 nm or more and 50 nm or less, 10 nm or more and 40 nm or less, 12 nm or more and 30 nm or less, 12 nm or more and 25 nm or less, or 15 nm or more and 22 nm or less. In the case where the average particle size of the magnetic powder is less than or equal to the above-mentioned upper limit value (e.g., 50 nm or less, particularly 30 nm or less), favorable electromagnetic conversion characteristics (e.g., SNR) can be obtained in the magnetic recording medium 10 having high recording density. In the case where the average particle size of the magnetic powder is not less than the above-mentioned lower limit value (e.g., 10 nm or more, favorably 12 nm or more), the dispersibility of the magnetic powder is further improved, and more excellent electromagnetic conversion characteristics (e.g., SNR) can be obtained.

In the case where the magnetic powder contains a powder of hexagonal ferrite particles, the average aspect ratio of the magnetic powder may favorably be 1.0 or more and 3.0 or less, more favorably 1.0 or more and 2.9 or less, and still more favorably 2.0 or more and 2.9 or less. When the average aspect ratio of the magnetic powder is within the above-mentioned numerical range, it is possible to suppress aggregation of the magnetic powder and suppress the resistance applied to the magnetic powder at the time when causing the magnetic powder to be perpendicularly oriented in the process of forming the magnetic layer 13. This may result in improvement in the perpendicular orientation of the magnetic powder.

In the case where the magnetic powder contains a powder of hexagonal ferrite particles, the average particle size and the average aspect ratio of the magnetic powder are obtained as follows.

First, the magnetic recording medium 10 to be measured is processed by the FIB (Focused Ion Beam) method or the like to obtain a slice. In the case of using the FIB method, a carbon film and a tungsten thin film are formed as a protective film as pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscopy (H-9500 manufactured by Hitachi High-Tech Corporation), the above-mentioned cross section of the obtained slice sample is observed so that the entire magnetic layer 13 is included with respect to the thickness direction of the magnetic layer 13 at an acceleration voltage of 200 kV and the total magnification of 500,000 times, and a TEM photograph is taken.

Figure 4:
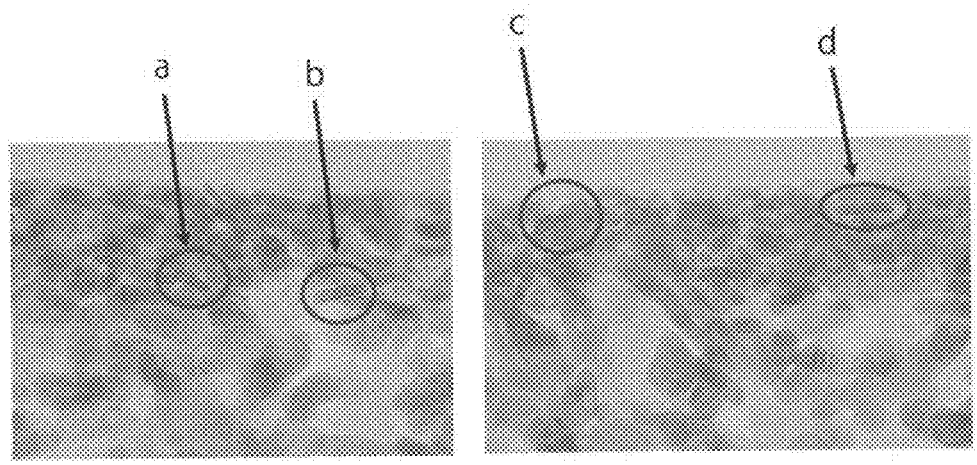
FIG. 4 is an example of a TEM photograph of a magnetic layer.

Next, 50 particles whose side surface is oriented in the direction of the observation surface and whose thickness can be clearly observed are selected from the obtained TEM photograph. For example, FIG. 4 shows an example of the TEM photograph. In FIG. 4, for example, particles indicated by a and d are selected because the thickness thereof can be clearly observed. A maximum plate thickness DA for each of the 50 selected particles is measured. The maximum plate thicknesses DA thus obtained are simply averaged (arithmetically averaged) to obtain an average maximum plate thickness $DA_{ave}$.

Subsequently, a plate diameter DB of each of the magnetic powders is measured. In order to measure the plate diameter DB of the particles, 50 particles whose plate diameter of the particle can be clearly observed are selected from the obtained TEM photograph. For example, in FIG. 4, particles indicated by b and c are selected because the plate diameter thereof can be clearly observed. The plate diameter DB of each of the 50 selected particles is measured. The plate diameters DB thus obtained are simply averaged (arithmetically averaged) to obtain an average plate diameter $DB_{ave}$. The average plate diameter $DB_{ave}$ is the average particle size.

Then, an average aspect ratio ($DB_{ave}/DA_{ave}$) of the particles is obtained from the average maximum plate thickness $DA_{ave}$ and the average plate diameter $DB_{ave}$.

In the case where the magnetic powder contains a powder of hexagonal ferrite particles, the average particle volume of the magnetic powder is favorably 2,000 $nm^3$ or less, favorably 1,900 $nm^3$ or less, more favorably 1,800 $nm^3$ or less, and still more favorably 1,700 $nm^3$ or less, 1,600 $nm^3$ or less, or 1,500 $nm^3$ or less. The average particle volume of the magnetic powder is favorably 500 $nm^3$ or more, and more favorably 700 $nm^3$ or more.

In the case where the average particle volume of the magnetic powder is less than or equal to the above-mentioned upper limit value (e.g., 2,000 $nm^3$ or less), favorable electromagnetic conversion characteristics (e.g., SNR) can be obtained in the magnetic recording medium 10 having high recording density. In the case where the average particle volume of the magnetic powder is greater than or equal to the above-mentioned lower limit value (e.g., 500 $nm^3$ or more), the dispersibility of the magnetic powder is further improved, and more excellent electromagnetic conversion characteristics (e.g., SNR) can be obtained.

The average particle volume of the magnetic powder is obtained as follows. First, as described with respect to the above-mentioned method of calculating the average particle size of the magnetic powder, the average maximum plate thickness $DA_{ave}$ and the average plate diameter $DB_{ave}$ are obtained. Next, the average particle volume V of the magnetic powder is obtained by the following formula.

$$V = 3\sqrt{3} \times DA_{ave} \times DB_{ave} \times DB_{ave} \qquad \text{[Math. 2]}$$

In accordance with a particularly favorable embodiment of the present disclosure, the magnetic powder may be a barium ferrite magnetic powder or strontium ferrite magnetic powder, and may be more favorably a barium ferrite magnetic powder. The barium ferrite magnetic powder contains magnetic particles of iron oxide having barium ferrite as a main phase (hereinafter, referred to as "barium ferrite particles"). The barium ferrite magnetic powder is highly reliable in recording data, e.g., the coercive force of the barium ferrite magnetic powder does not drop even in high-temperature and high-humidity environments. From this viewpoint, the barium ferrite magnetic powder is favorable as the above-mentioned magnetic powder.

The average particle size of the barium ferrite magnetic powder is 50 nm or less, more favorably 10 nm or more and 40 nm or less, and still more favorably 12 nm or more and 25 nm or less.

In the case where the magnetic layer 13 contains barium ferrite magnetic powder as the magnetic powder, the average thickness $t_m$ [nm] of the magnetic layer 13 is favorably 90 nm or less, and more favorably 80 nm or less. For example, the average thickness $t_m$ of the magnetic layer 13 may satisfy the following relationship: 35 nm $\leq t_m \leq$ 90 nm.

In addition, the coercive force Hc1 measured in the thickness direction (perpendicular direction) of the magnetic recording medium 10 is favorably 2,010 [Oe] or more and 3,520 [Oe] or less, more favorably 2,070 [Oe] or more and 3,460 [Oe] or less, and still more favorably 2,140 [Oe] or more and 3,390 [Oe] or less.

(Embodiment in which Magnetic Powder Contains ε-Iron Oxide)

In accordance with another favorable embodiment of the present disclosure, the above-mentioned magnetic powder may favorably contain a powder of nanoparticles containing ε-iron oxide (hereinafter, referred to as "ε-iron oxide particles"). The ε-iron oxide particles are capable of achieving a high coercive force even if the ε-iron oxide particles are fine particles. The ε-iron oxide contained in the ε-iron oxide particles is favorably crystal-oriented preferentially in the thickness direction (perpendicular direction) of the magnetic recording medium 10.

The ε-iron oxide particles each have a spherical shape or a substantially spherical shape, or each have a cubic shape or a substantially cubic shape. Since the ε-iron oxide particles have the above-mentioned shapes, in the case where ε-iron oxide particles are used as the magnetic particles, the area of contact between the particles in the thickness direction of the medium can be reduced and the aggregation of the particles can be suppressed as compared with the case of using hexagonal plate-shaped barium ferrite particles as the magnetic particles. Therefore, it is possible to increase the dispersibility of the magnetic powder and achieve a more favorable SNR (Signal-to-Noise Ratio).

Figure 5:
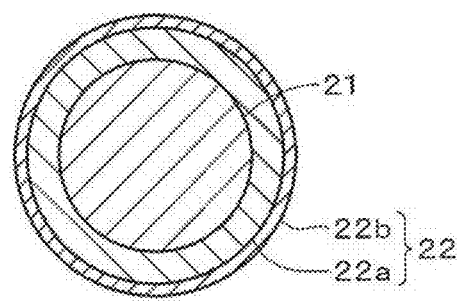
FIG. 5 is a cross-sectional view showing a configuration of magnetic particles.

The ε-iron oxide particles may each have a core-shell structure. Specifically, the ε-iron oxide particles each include a core portion 21 and a shell portion 22 having a two-layer structure provided around the core portion 21 as shown in FIG. 5. The shell portion 22 having the two-layer structure includes a first shell portion 22a provided on the core portion 21 and a second shell portion 22b provided on the first shell portion 22a.

The core portion 21 contains ε-iron oxide. The ε-iron oxide contained in the core portion 21 favorably has ε-$Fe_2O_3$ crystal as the main phase, and more favorably has a single phase of ε-$Fe_2O_3$.

The first shell portion 22a covers at least a part of the circumference of the core portion 21. Specifically, the first shell portion 22a may partially cover the periphery of the core portion 21 or may cover the entire periphery of the core portion 21. From the viewpoint of achieving sufficient exchange-coupling between the core portion 21 and the first shell portion 22a and improving magnetic properties, it is favorable to cover the entire surface of the core portion 21.

The first shell portion 22a is a so-called soft magnetic layer, and may contain a soft magnetic material such as α-Fe, a Ni—Fe alloy, and a Fe—Si—Al alloy. α-Fe may be obtained by reducing the ε-iron oxide contained in the core portion 21.

The second shell portion 22b is an oxide coating film as an oxidation prevention layer. The second shell portion 22b may contain α-iron oxide, aluminum oxide, or silicon oxide. α-iron oxide may include, for example, at least one iron oxide of $Fe_3O_4$, $Fe_2O_3$, or FeO. In the case where the first shell portion 22a contains α-Fe (soft magnetic material), the α-iron oxide may be one obtained by oxidizing α-Fe contained in the first shell portion 22a.

When the ε-iron oxide particles each have the first shell portion 22a as described above, thermal stability can be ensured. This allows the coercive force Hc of the core portion 21 alone to be kept large and/or the coercive force Hc of the ε-iron oxide particles (core-shell particles) as a whole to be adjusted to the coercive force Hc suitable for recording. In addition, when the ε-iron oxide particles each have the second shell portion 22b as described above, the deterioration of characteristics of the ε-iron oxide particles due to rust or the like generated on the surfaces of the particles by the ε-iron oxide particles being exposed to air in the process of producing the magnetic recording medium 10 and prior to the process can be suppressed. Therefore, it is possible to suppress the characteristic deterioration of the magnetic recording medium 10.

Figure 6:
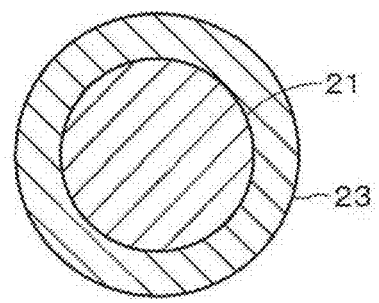
FIG. 6 is a cross-sectional view showing a configuration of magnetic particles in a modified example.

The ε-iron oxide particles may have a shell portion 23 having a single layer structure as shown in FIG. 6. In this case, the shell portion 23 has the same configuration as that of the first shell portion 22a. However, from the viewpoint of suppressing the deterioration of characteristics of the ε-iron oxide particles, it is more favorable that the ε-iron oxide particles each have the shell portion 22 having a two-layer structure.

The ε-iron oxide particles may contain an additive instead of a core-shell structure, or may contain an additive while having a core-shell structure. In these cases, some Fe of the ε-iron oxide particles are substituted by additives. Also when the ε-iron oxide particles contain an additive, the coercive force Hc of the entire ε-iron oxide particles can be adjusted to the coercive force Hc suitable for recording, so that ease of recording can be improved. The additive is a metal element other than iron, favorably a trivalent metal element, and more favorably one or more kinds selected from the group consisting of aluminum (Al), gallium (Ga), and indium (In).

Specifically, the ε-iron oxide containing an additive is ε-$Fe_{2-x}M_xO_3$ crystal (where M represents a metal element other than iron, favorably a trivalent metal element, and more favorably one or more kinds selected from the group consisting of Al, Ga, and In. x satisfies the following formula represented by: 0<x<1, for example.).

The average particle size (average maximum particle size) of the magnetic powder is favorably 22 nm or less, more favorably 8 nm or more and 22 nm or less, and still more favorably 12 nm or more and 22 nm or less. In the magnetic recording medium 10, the region that is half the size of the recording wavelength is the actual magnetization region. Therefore, by setting the average particle size of the magnetic powder to half or less of the shortest recording wavelength, it is possible to obtain a favorable SNR. Therefore, when the average particle size of the magnetic powder is 22 nm or less, favorable electromagnetic conversion characteristics (e.g., SNR) can be obtained in the magnetic recording medium 10 having high recording density (e.g., the magnetic recording medium 10 configured to be capable of recording signals at the shortest recording wavelength of 44 nm or less). Meanwhile, in the case where the average particle size of the magnetic powder is 8 nm or more, the dispersibility of the powder is further improved, and more excellent electromagnetic conversion characteristics (e.g., SNR) can be obtained.

The average aspect ratio of the magnetic powder is favorably 1.0 or more and 3.0 or less, more favorably 1.0 or more and 2.9 or less, and still more favorably 1.0 or more and 2.5 or less. When the average aspect ratio of the magnetic powder is within the above-mentioned numerical range, the aggregation of the magnetic powder can be suppressed, and the resistance applied to the magnetic powder at the time when the magnetic powder is perpendicularly oriented in the process of forming the magnetic layer 13 can be suppressed. Therefore, the perpendicular orientation of the magnetic powder can be improved.

In the case where the magnetic powder contains ε-iron oxide particles, the average particle size and the average aspect ratio of the magnetic powder are obtained as follows.

First, the magnetic recording medium 10 to be measured is processed by the FIB (Focused Ion Beam) method or the like to obtain a slice. In the case of using the FIB method, a carbon film and a tungsten thin film are formed as a protective film as pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscopy (H-9500 manufactured by Hitachi High-Tech Corporation), the above-mentioned cross section of the obtained slice sample is observed so that the entire magnetic layer 13 is included with respect to the thickness direction of the magnetic layer 13 at an acceleration voltage of 200 kV and the total magnification of 500,000 times, and a TEM photograph is taken.

Next, 50 particles whose shapes can be clearly observed are selected from the obtained TEM photograph, and the major axis length DL and the minor axis length DS of each particle are measured. Here, the major axis length DL means the largest one (so-called maximum Feret diameter) of the distances between two parallel lines drawn from all angles so as to be in contact with the contour of the particle. Meanwhile, the minor axis length DS means the largest one of the lengths of the particles in the direction perpendicular to the major axis (DL) of the particles.

Subsequently, the measured major axis lengths DL of the 50 particles are simply averaged (arithmetically averaged) to obtain an average major axis length $DL_{ave}$. The average major axis length $DL_{ave}$ thus obtained is used as an average particle size of the magnetic powder. Further, the measured minor axis lengths DS of the 50 particles are simply averaged (arithmetically averaged) to obtain an average minor axis length $DS_{ave}$. Then, an average aspect ratio ($DL_{ave}/DS_{ave}$) of the particles is obtained from the average major axis length $DL_{ave}$ and the average minor axis length $DS_{ave}$.

The average particle volume of the magnetic powder is favorably 2,000 nm$^3$ or less, favorably 1,900 nm$^3$ or less, more favorably 1,800 nm$^3$ or less, and still more favorably 1,700 or less, 1,600 or less, or 1,500 or less nm$^3$. The average particle volume of the magnetic powder is favorably 500 nm$^3$ or more, and more favorably 700 nm$^3$ or more.

In the case where the average particle volume of the magnetic powder is less than or equal to the above-mentioned upper limit value (e.g., 2,000 nm$^3$ or less), favorable electromagnetic conversion characteristics (e.g., SNR) can be obtained in the magnetic recording medium 10 having high recording density. In the case where the average particle volume of the magnetic powder is greater than or equal to the above-mentioned lower limit value (e.g., 500 nm$^3$ or more), the dispersibility of the magnetic powder is further improved, and more excellent electromagnetic conversion characteristics (e.g., SNR) can be obtained.

In the case where the ε-iron oxide particles are spherical or substantially spherical, the average particle volume of the magnetic powder is obtained as follows. First, the average major axis length $DL_{ave}$ is obtained in the same manner as the above-mentioned method of calculating the average particle size of the magnetic powder. Next, the average particle volume V of the magnetic powder is obtained by the following formula.

$$V=(\pi/6) \times DL_{ave}^3$$

In the case where the ε-iron oxide particles each have a cubic shape, the average particle volume of the magnetic powder is obtained as follows.

The magnetic recording medium 10 is processed by the FIB (Focused Ion Beam) method or the like to obtain a slice. In the case of using the FIB method, a carbon film and a tungsten thin film are formed as a protective film as pre-processing for observing a TEM image of a cross section to be described below. The carbon film is formed on the surface of the magnetic layer side and the surface of the back layer side of the magnetic recording medium 10 by a vapor deposition method, and the tungsten thin film is further formed on the surface of the magnetic layer side by a vapor deposition method or a sputtering method. The slicing is performed along the length direction (longitudinal direction) of the magnetic recording medium 10. That is, the slicing forms a cross section that is parallel to both the longitudinal direction and the thickness direction of the magnetic recording medium 10.

Using a transmission electron microscopy (H-9500 manufactured by Hitachi High-Tech Corporation), the cross section of the obtained slice sample is observed so that the entire magnetic layer 13 is included with respect to the thickness direction of the magnetic layer 13 at an acceleration voltage of 200 kV and the total magnification of 500,000 times, and a TEM photograph is taken. Note that depending on the type of the device, the magnification and acceleration voltage may be adjusted as appropriate.

Next, 50 particles whose shapes can be clearly observed are selected from the obtained TEM photograph, and a side length DC of each particle is measured. Subsequently, the measured side lengths DC of the 50 particles are simply averaged (arithmetically averaged) to obtain an average side length $DC_{ave}$. Next, the average side length $DC_{ave}$ is used to calculate an average particle volume $V_{ave}$ (particle volume) of the magnetic powder from the following formula.

$$V_{ave}=DC_{ave}^3$$

The coercive force Hc of the ε-iron oxide particles is favorably 2,500 Oe or more, and more favorably 2,800 Oe or more and 4,200 Oe or less.

(Embodiment in which Magnetic Powder Contains Co-Containing Spinel Ferrite)

In accordance with still another favorable embodiment of the present disclosure, the magnetic powder may contain a powder of nanoparticles containing Co-containing spinel ferrite (hereinafter, referred to also as "cobalt ferrite particles". That is, magnetic powder may be a cobalt-ferrite magnetic powder. The cobalt ferrite particles favorably have uniaxial crystal anisotropy. The cobalt ferrite magnetic particles each have, for example, a cubic shape or a substantially cubic shape. The Co-containing spinel ferrite may further contain, in addition to Co, one or more kinds selected from the group consisting of Ni, Mn, Al, Cu, and Zn.

The cobalt ferrite has, for example, the average composition represented by the following formula (1).

$$Co_xM_yFe_2O_z \quad (1)$$

(However, in the formula (1), M represents, for example, one or more metals selected from the group consisting of Ni, Mn, Al, Cu, and Zn. X represents a value within the range of $0.4 \leq x \leq 1.0$. y represents a value within the range of $0 \leq y \leq 0.3$. However, x and y satisfy the following relationship: $(x+y) \leq 1.0$. z represents a value within the range of $3 \leq z \leq 4$. Some Fe may be substituted by other metal elements.)

The average particle size of the cobalt ferrite magnetic powder is favorably 25 nm or less, and more favorably 23 nm or less. The coercive force Hc of the cobalt ferrite magnetic powder is favorably 2,500 Oe or more, and more favorably 2,600 Oe or more and 3,500 Oe or less.

In the case where the magnetic powder contains a powder of cobalt ferrite particles, the average particle size of the magnetic powder is favorably 25 nm or less, and more favorably 10 nm or more and 23 nm or less. When the average particle size of the magnetic powder is 25 nm or less, favorable electromagnetic conversion characteristics (e.g., SNR) can be obtained in the magnetic recording medium 10 having high recording density. Meanwhile, when the average particle size of the magnetic powder is 10 nm or more, the dispersibility of the magnetic powder is further improved, and more excellent electromagnetic conversion characteristics (e.g., SNR) can be obtained. In the case where the magnetic powder contains a powder of cobalt ferrite particles, the average aspect ratio and average particle size of the magnetic powder are obtained in the same manner as that in the case where the magnetic powder contains ε-iron oxide particles.

The average particle volume of the magnetic powder is favorably 2,000 nm³ or less, favorably 1,900 nm³ or less, more favorably 1,800 nm³ or less, and still more favorably 1700 nm³ or less, 1600 nm³ or less, or 1500 or less nm³. The average particle volume of the magnetic powder is favorably 500 nm³ or more, and more favorably 700 nm³ or more.

In the case where the average particle volume of the magnetic powder is less than or equal to the above-mentioned upper limit value (e.g., 2,000 nm³ or less), favorable electromagnetic conversion characteristics (e.g., SNR) can be obtained in the magnetic recording medium 10 having high recording density. In the case where the average particle volume of the magnetic powder is greater than or equal to the above-mentioned lower limit value (e.g., 500 nm³ or more), the dispersibility of the magnetic powder is further improved, and more excellent electromagnetic conversion characteristics (e.g., SNR) can be obtained.

(Binder)

As the binder, a resin having a structure in which a crosslinking reaction is performed on a polyurethane resin, a vinyl chloride resin, or the like is favorable. However, the binder is not limited thereto, and other resins may be appropriately blended depending on the physical properties required for the magnetic recording medium 10, and the like. The resin to be blended is not particularly limited as long as it is a resin commonly used in the coating-type magnetic recording medium 10.

As the binder, for example, one selected from the group consisting of polyvinyl chloride, polyvinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber, or a combination of two or more of them is used.

Further, as the binder, a thermosetting resin or a reactive resin may be used. Examples of the thermosetting resin or reactive resin include a phenol resin, an epoxy resin, a urea resin, a melamine resin, an alkyd resin, a silicone resin, a polyamine resin, and a urea formaldehyde resin.

In addition, a polar functional group such as —SO₃M, —OSO₃M, —COOM, and P=O(OM)₂ may be introduced into each of the above-mentioned binders for the purpose of improving dispersibility of the magnetic powder. Here, M represents a hydrogen atom, or an alkali metal such as lithium, potassium, and sodium.

Further, examples of the polar functional groups include those of the side chain type having a terminal group of —NR1R2, —NR1R2R3⁺X⁻, and those of the main chain type of >NR1R2⁺X⁻. Here, in the formula, R1, R2, and R3 each represent a hydrogen atom or a hydrocarbon group independently from each other, and X⁻ represents, for example, a halogen element ion such as fluorine, chlorine, bromine, and iodine, or an inorganic or organic ion. Further, examples of the polar functional group include —OH, —SH, —CN, and epoxy groups. The amount of these polar functional groups to be introduced into the binder is favorably $10^{-1}$ to $10^{-8}$ mol/g, and more favorably $10^{-2}$ to $10^{-6}$ mol/g.

(Lubricant)

The above-mentioned magnetic layer may contain a lubricant. The above-mentioned lubricant may be, for example, one or two or more kinds selected from fatty acids and/or fatty acid esters, and may favorably include both fatty acids and fatty acid esters. The above-mentioned fatty acid may be favorably a compound represented by the following general formula (1) or (2). For example, one of the compound represented by the following general formula (1) and the compound represented by the general formula (2) may be contained as the above-mentioned fatty acid, or both of them may be contained.

Further, the above-mentioned fatty acid ester may be favorably a compound represented by the following general formula (3) or (4). For example, one of the compound represented by the following general formula (3) and the compound represented by the general formula (4) may be contained as the above-mentioned fatty acid ester, or both of them may be contained.

When the above-mentioned lubricant includes one or both of the compound represented by the general formula (1) and the compound represented by the general formula (2), and one or both of the compound represented by the general formula (3) and the compound represented by the general formula (4), it is possible to suppress the increase in the dynamic frictional coefficient due to the repetitive recording or reproduction of the magnetic recording medium.

$$CH_3(CH_2)_k COOH \quad (1)$$

(However, in the general formula (1), k represents an integer selected from the range of 14 or more and 22 or less, and more favorably the range of 14 or more and 18 or less.)

$$CH_3(CH_2)_n CH=CH(CH_2)_m COOH \quad (2)$$

(However, in the above-mentioned general formula (2), the sum of n and m is an integer selected from the range of 12 or more and 20 or less, and more favorably the range of 14 or more and 18 or less.)

$$CH_3(CH_2)_p COO(CH_2)_q CH_3 \quad (3)$$

(However, in the general formula (3), p represents an integer selected from the range of 14 or more and 22 or less, and more favorably 14 or more and 18 or less, and q represents an integer selected from the range of 2 or more and 5 or less, and more favorably the range of 2 or more and 4 or less.)

$$CH_3(CH_2)_r COO—(CH_2)_s CH(CH_3)_2 \quad (4)$$

(However, in the above-mentioned general formula (4), r represents an integer selected from the range of 14 or more and 22 or less, and s represents an integer selected from the range of 1 or more and 3 or less.)

Examples of the lubricant include esters of monobasic fatty acids having 10 to 24 carbon atoms and any of 1 to 6 valent alcohols having 2 to 12 carbon atoms, mixed esters thereof, difatty acid esters, and trifatty acid esters. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

(Antistatic Agent)

Examples of the antistatic agent include carbon black, natural surfactants, nonionic surfactants, and cationic surfactants.

(Abrasive)

Examples of the abrasive include α-alumina with pregelatinization rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating and annealing the raw material of magnetic iron oxide, and those surface-treated with aluminum and/or silica as necessary.

(Curing Agent)

Examples of the curing agent include polyisocyanate. Examples of the polyisocyanate include aromatic polyisocyanates such as an adduct of tolylene diisocyanate (TDI) and an active hydrogen compound, and aliphatic polyisocyanates such as an adduct of hexamethylene diisocyanate (HMDI) and an active hydrogen compound. The weight average molecular weight of these polyisocyanates is desirably in the range of 100 to 4,500.

(Rust Inhibitor)

Examples of the rust inhibitor include phenols, naphthols, quinones, heterocyclic compounds containing a nitrogen atom, heterocyclic compounds containing an oxygen atom, and heterocyclic compounds containing a sulfur atom.

(Non-Magnetic Reinforcing Particles)

Examples of the non-magnetic reinforcing particles include aluminum oxide (α, β, or γ alumina), chromium oxide, silicon oxide, diamond, garnet, emery, boron nitride, titanium carbide, silicon carbide, titanium carbide, and titanium oxide (rutile or anatase type titanium oxide).

(Underlayer)

The underlayer 12 is a non-magnetic layer containing a non-magnetic powder and a binder. The underlayer 12 may further contain at least one additive of a lubricant, an antistatic agent, a curing agent, a rust inhibitor, or the like as necessary.

The average thickness of the underlayer 12 is favorably 0.6 μm or more and 2.0 μm or less, and more favorably 0.6 μm or more and 1.4 μm or less. Note that the average thickness of the underlayer 12 is obtained in the same manner as the average thickness of the magnetic layer 13. However, the magnification of the TEM image is appropriately adjusted in accordance with the thickness of the underlayer 12.

In a favorable embodiment of the present disclosure, the underlayer 12 is provided between the magnetic layer 13 and the base 11, and the average thickness of the underlayer 12 may be 2.0 μm or less.

(Non-Magnetic Powder)

The non-magnetic powder includes, for example, at least one of an inorganic particle powder or an organic particle powder. Further, the non-magnetic powder may include a carbon powder such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include various shapes such as a needle shape, a spherical shape, a cubic shape, and a plate shape, but are not limited to these shapes.

(Binder)

The description regarding the binder contained in the above-mentioned magnetic layer 13 is also true for the binder contained in the underlayer (Additive)

The description regarding the lubricant, the antistatic agent, the curing agent, and the rust inhibitor contained in the above-mentioned magnetic layer 13 also applies to the lubricant, the antistatic agent, the curing agent, and the rust inhibitor contained in the underlayer.

(Back Layer)

The back layer 14 may contain a binder and a non-magnetic powder. The back layer 14 may further contain at least one additive of a lubricant, a curing agent, an antistatic agent, or the like as necessary. The description regarding the binder and the non-magnetic powder contained in the above-mentioned underlayer 12 also apply to the binder and the non-magnetic powder contained in the back layer.

The average particle size of the non-magnetic powder is favorably 10 nm or more and 150 nm or less, more favorably 15 nm or more and 110 nm or less. The average particle size of the non-magnetic powder is obtained in a way similar to that for the average particle size of the above-mentioned magnetic particle. The non-magnetic powder may include a non-magnetic powder having two or more particle size distributions.

The average thickness of the back layer 14 (referred to also as the "average thickness $t_b$" or "$t_b$" in the present specification) is favorably 0.6 μm or less. When the average thickness $t_b$ of the back layer 14 is within the above-mentioned range, the thickness of the underlayer 12 and the base 11 can be kept thick even if the average thickness of the magnetic recording medium 10 is 5.3 μm or less. As a result, it is possible to maintain the traveling stability of the magnetic recording medium 10 in a recording/reproduction apparatus. The lower limit value of the average thickness $t_b$ of the back layer 14 is not particularly limited, but is, for example, 0.2 μm or more.

In a favorable embodiment of the present disclosure, the back layer 14 is provided on the surface opposed to the surface on which the magnetic layer 13 is provided, of the two surfaces of the base 11, and the average thickness of the back layer 14 may be 0.6 μm or less.

The average thickness $t_b$ of the back layer 14 is obtained as follows. First, the average thickness $t_T$ of the magnetic recording medium 10 is measured. The method of measuring the average thickness $t_T$ is described herein below. Subsequently, the back layer 14 of the sample is removed with a solvent such as MEK (methyl ethyl ketone) and dilute hydrochloric acid. Next, the thickness of the sample is measured at five or more points using a laser hologage (LGH-110C) manufactured by Mitutoyo, and the measured values are simply averaged (arithmetically averaged) to calculate an average value $t_B$ [μm]. After that, the average thickness $t_b$ [μm] of the back layer 14 is obtained from the following formula. Note that the measurement positions are randomly selected from the sample.

$$t_b\ [\mu m] = t_T\ [\mu m] - t_B\ [\mu m]$$

(Average thickness $t_T$ of magnetic recording medium)

The average thickness of the magnetic recording medium 10 (referred to also as the "average thickness $t_T$" or "$t_T$" in the present specification) is favorably 5.3 μm or more, and more favorably 5.2 μm or less, and may be still more favorably 5.1 μm or more, 5.0 μm or less, 4.8 μm or less, or 4.6 μm or less. When the average thickness $t_T$ of the magnetic recording medium 10 is within the above-mentioned numerical range (e.g., $t_T \leq 5.6$ μm), the recording capacity in one data cartridge can be increased as compared with the existing data cartridge. The lower limit value of the average thickness $t_T$ of the magnetic recording medium 10 is not particularly limited, but satisfies the relationship: 3.5 µm≤$t_T$, for example.

The average thickness $t_T$ of the magnetic recording medium 10 is obtained as follows. First, the magnetic recording medium 10 having a ½ inch width is prepared and cut into a 250 mm length to prepare a sample. Next, using a laser hologage (LGH-110C) manufactured by Mitutoyo as a measuring device, the thickness of the sample is measured at five or more points, and the measured values are simply averaged (arithmetically averaged) to calculate the average value $t_T$ [µm]. Note that the measurement positions are randomly selected from the sample.

(Coercive Force Hc1 in Perpendicular Direction)

The coercive force Hc1 in the perpendicular direction is 4,500 Oe or less, more favorably 3,500 Oe or less, and still more favorably 3,000 Oe or less, 2,900 Oe or less, or 2,850 Oe or less. The large coercive force Hc1 is favorable because it is less susceptible to thermal disturbance and a demagnetizing field. Meanwhile, when the coercive force Hc1 exceeds 4,500 Oe, there is a possibility that saturated recording by the recording head becomes difficult. As a result, portions that cannot be recorded are present and noises are increased, thereby deteriorating the electromagnetic conversion characteristics (e.g., SNR).

The coercive force Hc1 in the perpendicular direction is favorably 500 Oe or more, and more favorably 1,000 Oe or more, and may be still more favorably 1,500 Oe or more, 2,000 Oe or more, 2,100 Oe or more, 2,200 Oe or more, 2,300 Oe or more, or 2,400 Oe or more. When the coercive force Hc1 is greater than or equal to the above-mentioned lower limit value, it is possible to suppress a decrease in electromagnetic conversion characteristics (e.g., SNR) in high temperature environments due to the influence of thermal disturbance and the influence of a demagnetizing field.

The coercive force Hc1 in the perpendicular direction is obtained as follows. First, three sheets of the magnetic recording medium 10 are superimposed on each other with double-sided tapes, and then punched out by a punch of 0.39 mm to prepare a measurement sample. At this time, markings are made with arbitrary inks that do not have magnetism so that the longitudinal direction (traveling direction) of the magnetic recording medium 10 can be recognized. Then, using a vibrating sample magnetometer (VSM), the M-H loop of the measurement sample (the entire magnetic recording medium 10) corresponding to the perpendicular direction of the magnetic recording medium 10 (the thickness direction of the magnetic recording medium 10) is measured. Next, acetone, ethanol, or the like is used to wipe off the coating film (the underlayer 12, the magnetic layer 13, the back layer 14, and the like), leaving only the base 11. Then, three sheets of the obtained bases 11 are superimposed on each other with double-sided tapes, and then punched out by a punch of 0.39 mm to obtain a sample for background correction (hereinafter, referred to simply as a sample for correction). The VSM is then used to measure the M-H loop of the sample for correction (the base 11) corresponding to the perpendicular direction of the base 11 (the thickness direction of the magnetic recording medium 10).

In the measurement of the M-H loop of the measurement sample (the entire magnetic recording medium 10) and the M-H loop of the sample for correction (the base 11), a highly sensitive vibrating sample magnetometer "VSM-P7-15 type" manufactured by TOEI INDUSTRY CO., LTD. is used. The measurement conditions are as follows: measurement mode: full loop, the maximum magnetic field: 15 kOe, the magnetic field step: 40 bit, Time constant of Locking amp: 0.3 sec, Waiting time: 1 sec, and MH average number: 20.

After two M-H loops are obtained, background correction is performed by subtracting the M-H loop of the sample for correction (the base 11) from the M-H loop of the measurement sample (the entire magnetic recording medium 10) to obtain the M-H loop after background correction. The measurement/analysis program attached to the "VSMP7-15 type" is used to calculate the background correction.

The coercive force Hc1 in the perpendicular direction is obtained from the obtained M-H loop after the background correction. Note that for this calculation, the measurement/analysis program attached to the "VSM-P7-15 type" is used. Note that the above-mentioned measurement of the M-H loop is performed at 25° C. Further, the "demagnetizing field correction" when measuring the M-H loop in the perpendicular direction of the magnetic recording medium 10 is not performed.

(Coercive Force Hc2 in Longitudinal Direction)

The coercive force Hc2 in the longitudinal direction is favorably 2,000 Oe or less, more favorably 1,900 Oe or less, and still more favorably 1,800 Oe or less. When the coercive force Hc2 in the longitudinal direction is 2,000 Oe or less, since the magnetization reacts sensitively by the magnetic field in the perpendicular direction from the recording head, a favorable recording pattern can be formed.

The coercive force Hc2 in the longitudinal direction is favorably 1,000 Oe or more. When the coercive force Hc2 in the longitudinal direction is 1,000 Oe or more, it is possible to suppress the demagnetization due to leakage flux from the recording head.

The above-mentioned coercive force Hc2 is obtained as follows.

First, three sheets of the magnetic recording medium 10 are superimposed on each other with double-sided tapes, and then punched out by a punch of 0.39 mm to prepare a measurement sample. At this time, markings are made with arbitrary inks that do not have magnetism so that the longitudinal direction (traveling direction) of the magnetic recording medium 10 can be recognized. Then, using a vibrating sample magnetometer (VSM), the M-H loop of the measurement sample (the entire magnetic recording medium 10) corresponding to the longitudinal direction (traveling direction) of the magnetic recording medium 10 is measured. Next, acetone, ethanol, or the like is used to wipe off the coating film (the underlayer 12, the magnetic layer 13, and the back layer 14), leaving only the base 11. Then, three sheets of the obtained bases 11 are superimposed on each other with double-sided tapes, and then punched out by a punch of 0.39 mm to prepare a sample for background correction (hereinafter, referred to simply as the "sample for correction"). The VSM is then used to measure the M-H loop of the sample for correction (the base 11) corresponding to the longitudinal direction of the base 11 (the longitudinal direction of the magnetic recording medium 10).

In the measurement of the M-H loop of the measurement sample (the entire magnetic recording medium 10) and the M-H loop of the sample for correction (the base 11), a highly sensitive vibrating sample magnetometer "VSM-P7-15 type" manufactured by TOEI INDUSTRY CO., LTD. is used. The measurement conditions are as follows: measurement mode: full loop, the maximum magnetic field: 15 kOe, the magnetic field step: 40 bit, Time constant of Locking amp: 0.3 sec, Waiting time: 1 sec, and MH average number: 20.

After the M-H loop of the measurement sample (the entire magnetic recording medium 10) and the M-H loop of the sample for correction (the base 11) are obtained, background correction is performed by subtracting the M-H loop of the sample for correction (the base 11) from the M-H loop of the measurement sample (the entire magnetic recording medium 10) to obtain the M-H loop after background correction. The measurement/analysis program attached to the "VSMP7-15 type" is used to calculate the background correction.

The coercive force Hc2 is obtained from the obtained M-H loop after background correction. Note that for this calculation, the measurement/analysis program attached to the "VSM-P7-15 type" is used. Note that the above-mentioned measurement of the M-H loop is performed at 25° C. Further, the "demagnetizing field correction" when measuring the M-H loop in the longitudinal direction of the magnetic recording medium 10 is not performed.

(Hc2/Hc1)

A ratio Hc2/Hc1 of the coercive force Hc2 in the longitudinal direction to the coercive force Hc1 in the perpendicular direction satisfies the following relationship: Hc2/Hc1≤0.8, favorably Hc2/Hc1≤0.75, more favorably Hc2/Hc1≤0.7, till more favorably Hc2/Hc1≤0.65, and particularly favorably Hc2/Hc1≤0.6, for example. When the coercive forces Hc1 and Hc2 satisfy the above-mentioned relationship, the degree of perpendicular orientation of the magnetic powder can be enhanced. Therefore, the magnetization transitional width can be reduced and a high-output signal can be obtained at the time of signal reproduction, it is possible to improve the electromagnetic conversion characteristics (e.g., C/N). Note that as described above, when Hc2 is low, since the magnetization reacts sensitively by the magnetic field in the perpendicular direction from the recording head, a favorable recording pattern can be formed.

In the case where the ratio Hc2/Hc1 satisfies the following relationship: Hc2/Hc1≤0.8, it is particularly advantageous for the average thickness of the magnetic layer 13 to be 90 nm or less. When the average thickness of the magnetic layer 13 exceeds 90 nm, in the case where a ring-type head is used as the recording head, the lower region of the magnetic layer 13 (region on the side of the underlayer 12) is magnetized in the longitudinal direction, and there is a possibility that the magnetic layer 13 cannot be uniformly magnetized in the thickness direction. Therefore, even if the ratio Hc2/Hc1 satisfies the relationship of Hc2/Hc1≤0.8 (i.e., the degree of perpendicular orientation of the magnetic powder is increased), there is a possibility that electromagnetic conversion characteristics (e.g., C/N) cannot be improved.

The lower limit value of Hc2/Hc1 is not particularly limited, but satisfies the following relationship: 0.5≤Hc2/Hc1, for example.

Note that Hc2/Hc1 represents the degree of perpendicular orientation of the magnetic powder. The smaller Hc2/Hc1, the higher the degree of perpendicular orientation of the magnetic powder. The reason why Hc2/Hc1 is used as an index representing the degree of perpendicular orientation of the magnetic powder in this embodiment will be described below.

A squareness ratio SQ (=(Mr/Ms)×100, where Mr(emu): residual magnetization, Ms(emu): saturation magnetization) has been generally used in the past as an index (parameter) representing the degree of perpendicular orientation of the magnetic powder. However, the index of the squareness ratio SQ is not more suitable than Hc2/Hc1 as an index representing the degree of perpendicular orientation of the magnetic powder for the following reason.

Figure 7:
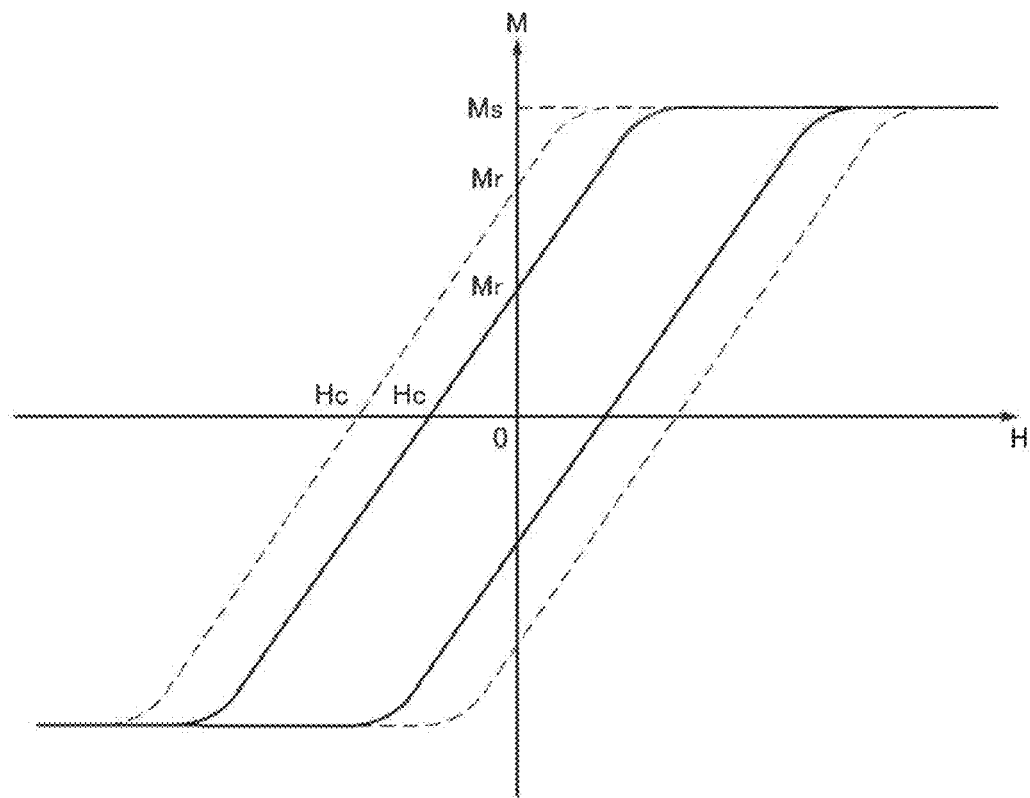
FIG. 7 is a graph showing an example of an M-H loop.

(1) The squareness ratio SQ varies depending on the value of the coercive force Hc of the magnetic powder. For example, as shown in FIG. 7, when the coercive force Hc of the magnetic powder increases, the squareness ratio SQ is apparently increased.

(2) The squareness ratio SQ is affected by distortion of the M-H loop due to overdispersion.

In this regard, in this embodiment, Hc2/Hc1 can be used as an index representing the degree of orientation of the magnetic powder more appropriately. Because the coercive forces Hc1 and Hc2 simply vary depending on the orientation direction of the magnetic powder, Hc2/Hc1 is more suitable as an index of the degree of orientation of the magnetic powder.

(Residual Coercive Force Hrp and Ratio Hrp/Hc1)

In the magnetic recording medium according to the present disclosure, the ratio Hrp/Hc1 of the residual coercive force Hrp of the magnetic recording medium measured using the pulsed magnetic field to the coercive force Hc1 of the above-mentioned magnetic recording medium in the perpendicular direction is 2.10 or less, favorably 2.05 or less, and more favorably 2.00 or less, and may be still more favorably 1.95 or less, 1.90 or less, or 1.85 or less. When the magnetic recording medium according to the present disclosure has the ratio Hrp/Hc1 within the above-mentioned numerical range, it is excellent in preservation stability even though the average particle volume of the magnetic powder is low.

The above-mentioned ratio Hrp/Hc1 may be, for example, 0 or more, 0.50 or more, or 1.00 or more.

Hc1 used for the calculating the above-mentioned ratio Hrp/Hc1 is measured as described above.

Hrp used for the calculating the above-mentioned ratio Hrp/Hc1 is obtained as follows.

A sample similar to the sample used for calculating the coercive force Hc1 is prepared as a measurement sample, and a residual magnetization curve in the direction perpendicular to the film surface is obtained using a fast response characteristic evaluation device HR-PVSM20 manufactured by HAYAMA Co. Ltd. as follows.

First, a magnetic field of approximately −3,980 kA/m (−50 kOe) in the perpendicular direction to the measurement sample, and the magnetic field is returned to zero to achieve a residual magnetization state. After that, a magnetic field of approximately 40.2 kA/m (approximately 505 Oe) is applied in the opposite direction, and the magnetic field is returned to zero again to measure the residual magnetization amount. The applied magnetic field at this time is a pulsed magnetic field having a pulse width of $10^{-8}$ sec. After that, the measurement of applying a magnetic field that is approximately 40.2 kA/m larger than the previously applied magnetic field to return the magnetic field to zero is repeated in the same manner, the residual magnetization amount is plotted against the applied magnetic field to create a DCD curve. The measured magnetic field is up to approximately 20 kOe. Note that the background correction and demagnetizing field correction are not performed. The measurement conditions are shown below.

Initial magnetizing voltage: 220 V (equivalent to −3,980 kA/m)

Measurement starting voltage: 0 V (corresponding to 0 Oe)

Step voltage: 17.5 V (corresponding to approximately 505 Oe)

Maximum voltage: 350 V (equivalent to 20 kOe)

Lock-in amplifier waiting time: 10 seconds

Figure 8:
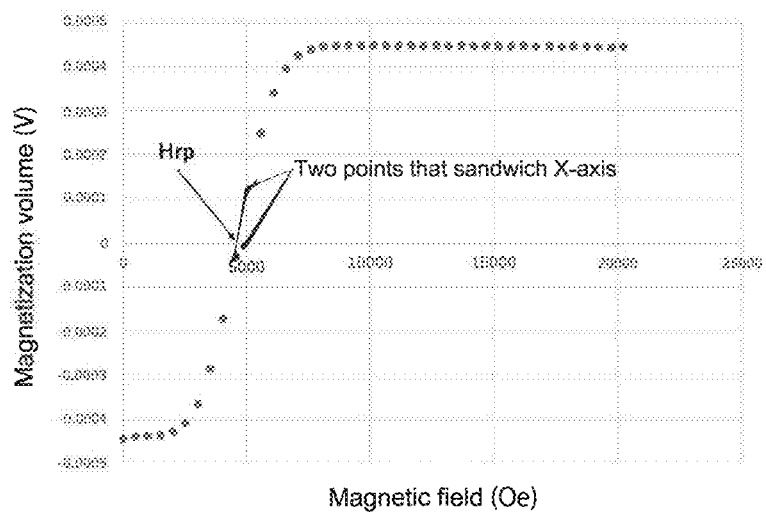
FIG. 8 is an example of a residual magnetization curve.

For example, the residual magnetization curve shown in FIG. 8 is obtained from the data obtained by the above-mentioned measurement. Phase correction is performed as necessary to obtain a residual magnetization curve from the data. The phase correction will be described below. Of the points that form the obtained residual magnetization curve, two points that sandwich the X-axis (two points closest to the X-axis) are connected by a straight line, and the point at which the straight line intersects the X-axis is calculated as Hrp.

The phase correction is described in more detail below.

Although the unit of the magnetization volume is originally emu, the magnetization volume at each applied magnetic field is output as a voltage V and either positive or negative value of the magnetization volume (voltage V) at each applied magnetic field is output as a positive value regarding the above-mentioned fast response characteristic evaluation device. Therefore, it is necessary to perform correction according to the phase at each applied magnetic field. For the correction, the phase information data included in the output result by the fast response characteristic evaluation device is used. Also the phase information data is output for each applied magnetic field together with the magnetization volume (voltage V) at each applied magnetic field.

In the case where the phase information data of the measured magnetization volume (voltage V) for a certain magnetic field is a negative value, the measured magnetization volume (voltage V) needs to be multiplied by "−1", and a value obtained by multiplying the measured magnetization volume (voltage V) by "−1" is used to obtain a residual magnetization curve. The processing of multiplying by "−1" is the above-mentioned phase correction.

Meanwhile, in the case where the phase information data of the measured magnetization volume (voltage V) for a certain magnetic field is a positive value, the measured magnetization volume (voltage V) needs not be multiplied by "4", and the measured magnetization volume (voltage V) is used as it is to obtain a residual magnetization curve.

By plotting the magnetization volume after phase correction obtained as described above (multiplied by "−1") and the measured magnetization volume (not multiplied by "−1") with respect to the magnetic field, the residual magnetization curve as shown in FIG. 8 is obtained.

(Thermal Stability)

The thermal stabilization $K_u V_{act}/k_B T$ of the magnetic recording medium according to the present disclosure is, for example, 60 or more, favorably 63 or more, and more favorably 65 or more, and may be still more favorably 67 or more, 70 or more, 73 or more, or 75 or more. Despite containing the magnetic powder having a small average particle volume, the magnetic recording medium according to the present disclosure has such high thermal stability, which makes it excellent in preservation stability.

The thermal stability $K_u V_{act}/k_B T$ of the magnetic recording medium according to the present disclosure may be, for example, 150 or less, or 100 or less.

The thermostability $K_u V_{act}/k_B T$ of the magnetic recording medium can be achieved by, for example, stabilizing the material state after glass dissolution during the process of synthesizing the magnetic powder. For example, although the dissolution temperature is arbitrarily set at the time of glass dissolution, the amorphous state of the material after glass dissolution is further uniformized by setting the dissolution temperature at this time to a high temperature, thereby making it possible to stabilize the material state. Further, the thermal stability $K_u V_{act}/k_B T$ can be adjusted also by improving the degree of perpendicular orientation.

The thermal stability $K_u V_{act}/k_B T$ of the magnetic recording medium (Ku: magnetocrystalline anisotropy constant of the magnetic powder, $V_{act}$: activation volume of the magnetic powder, $k_B$: Boltzmann constant, T: absolute temperature) is calculated using the Sherlock's equation shown below (Reference Literatures: IEEE TRANSACTIONS ON MAGNETICS, VOL. 50, NO. 11, NOVEMBER 2014, and J. Flanders and M. P. Sharrock: J. Appl. Phys., 62, 2918 (1987))

$$H_r(t')=H_0[1-\{k_B T/(K_u V_{act})\ln(f_0 t'/0.693)^n\}]$$

(However, $H_r$: residual magnetic field, t': magnetization attenuation amount, $H_0$: magnetic field change amount, $k_B$: Boltzmann constant, T: absolute temperature, Ku: magnetocrystalline anisotropy constant, $V_{act}$: activation volume of the magnetic powder, $f_0$: frequency factor, n: coefficient)

Note that the (a) residual magnetic field $H_r$, (b) magnetization attenuation amount t', and (c) magnetic field change amount $H_0$ are obtained as follows. Further, as the (d) frequency factor $f_0$ and (e) coefficient n, the following numerical values are used. Further, the absolute temperature T is 25° C.

The (a) residual magnetic field $H_r$ can be measured by a pulse VSM "FIR-PVSM20" manufactured by HAYAMA Co. Ltd. For the measurement, a sample obtained by the preparation method similar to the above-mentioned method of measuring the coercive force Hc1 is used. Before starting the measurement, a magnetic field of 6,358 [Oe] is applied to the sample to magnetically orient the sample in one direction. After that, a magnetic field is intermittently applied every 505.75 [Oe] from 0 to 20230 [Oe], the magnetization volume at that time is measured, and the values are plotted with the applied magnetic field as the X-axis and the magnetization volume as the Y-axis. The X when the Y=0 in the obtained graph is the residual magnetic field $H_r$.

The (b) magnetization attenuation amount t' is obtained as follows. That is, by applying, under three conditions, an external magnetic field in the vicinity of the coercive force Hc of the magnetic recording medium to be measured, a sample obtained by the preparation method similar to the above-mentioned method of measuring the coercive force Hc1 is used to measure the magnetization attenuation amount by the VSM similar to that in the above-mentioned method of measuring the coercive force Hc1. Then, the magnetization attenuation amount t' is calculated using the Flanders' equation described in the following Reference Literature from the magnetization attenuation amount (Reference Literature: I. P. J. Flanders and M. P. Sharrock, "An analysis of time-dependent magnetization and coercivity and of their relationship to print-through in recording tapes," J. Appl. Phys., vol. 62, pp. 2918-2928, 1987.).

Here, the "coercive force Hc" means the coercive force Hc in the orientation direction of the magnetic powder. That is, in the case where the magnetic powder is oriented in the perpendicular direction, the "coercive force Hc" means the coercive force Hc1 in the perpendicular direction. Meanwhile, in the case where the magnetic powder is oriented in the longitudinal direction, the "coercive force Hc" means the coercive force Hc2 in the longitudinal direction. In the case where the magnetic powder is not oriented, i.e., in the case of no orientation, it is used as the coercive force Hc1 in the perpendicular direction.

Further, the "external magnetic field under three conditions" means a magnetic field equal to or higher than the coercive force Hc (a magnetic field in which a positive magnetization is obtained), a magnetic field near the coercive force Hc (a magnetic field in which a magnetization close to zero is obtained), and a magnetic field below the coercive force Hc (a magnetic field in which a negative magnetization is obtained). As a specific example, in the case where the perpendicular orientation tape Hc=2600 [Oe], the "external magnetic field under the three conditions" is calculated with the magnetic field in which a positive magnetization is obtained=2,400 [Oe], the magnetic field near the coercive force Hc=2,600 [Oe], and the magnetic field in which a negative magnetization is obtained=2,800 [Oe]. However, the numerical values given as the specific example do not limit the numerical range in actual measurement.

The (c) magnetic field change amount $H_0$ is a constant obtained by substituting the measurement magnetic field and magnetization attenuation amount measured in (b) into the Sherlock's equation for calculation.

The (d) frequency factor $f_0$ is a constant value, and $f_0=5.0\times10^9$ Hz.

The (e) coefficient n is set to a value corresponding to the magnetocrystalline anisotropy of the magnetic powder. In the case where the magnetic powder has a uniaxial magnetocrystalline anisotropy and the magnetic tape is perpendicularly oriented, n is set to 0.5. Meanwhile, in the case where the magnetic powder has a polyaxial magnetocrystalline anisotropy (triaxial magnetocrystalline anisotropy), or the magnetic powder has a uniaxial magnetocrystalline anisotropy but the magnetic tape is not oriented, n is set to 0.77.

(2) Method of Producing Magnetic Recording Medium

Next, a method of producing of the magnetic recording medium 10 having the above-mentioned configuration will be described. First, a coating material for forming an underlayer is prepared by kneading and dispersing a non-magnetic powder, a binder, and the like in a solvent. Next, a coating material for forming a magnetic layer is prepared by kneading and dispersing a magnetic powder, a binder, and the like in a solvent. For preparing the coating material for forming a magnetic layer and coating material for forming an underlayer, for example, the following solvents, dispersing devices and kneading devices can be used.

Examples of the solvent used for preparing coating materials include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the above-mentioned kneading apparatus used for the preparation of the coating materials, for example, a kneading apparatus such as a continuous twin-screw kneader, a continuous twin-screw kneader capable of diluting in multiple stages, a kneader, a pressure kneader, and a roll kneader can be used. However, the present technology is not particularly limited to these apparatuses. Further, as the above-mentioned dispersion apparatus used for the preparation of the coating materials, for example, a dispersion apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser can be used. However, the present technology is not particularly limited to these apparatuses.

Next, the coating material for forming an underlayer is applied to one main surface of the base 11 and dried to form the underlayer 12. Subsequently, the coating material for forming a magnetic layer is applied onto this underlayer 12 and dried to form the magnetic layer 13 on the underlayer 12. Note that during drying, the magnetic field of the magnetic powder is oriented in the thickness direction of the base 11 by, for example, a solenoidal coil. Further, during drying, the magnetic field of the magnetic powder may be oriented in the traveling direction (longitudinal direction) of the base 11 by, for example, a solenoid coil, and then oriented in the thickness direction of the base 11. By performing such magnetic field orientation processing, it is possible to lower the ratio Hc2/Hc1. Therefore, the degree of perpendicular orientation of the magnetic powder can be improved. After the magnetic layer 13 is formed, the back layer 14 is formed on the other main surface of the base 11. As a result, the magnetic recording medium 10 is obtained.

The ratio Hc2/Hc1 is set to a desired value by, for example, adjusting the strength of the magnetic field applied to the coating film of the coating material for forming a magnetic layer, the concentration of the solid content in the coating material for forming a magnetic layer, and the drying conditions (drying temperature and drying time) of the coating film of the coating material for forming a magnetic layer. The strength of the magnetic field applied to the coating film is favorably not less than twice and not more than three times the coercive force of the magnetic powder. In order to further increase the ratio Hc2/Hc1, it is favorable to improve the dispersed state of the magnetic powder in the coating material for forming a magnetic layer. Further, in order to further increase the ratio Hc2/Hc1, it is also effective to magnetize the magnetic powder at a stage prior to the coating material for forming a magnetic layer enters the orientation device for causing the magnetic field of the magnetic powder to be oriented. Note that the above-mentioned methods of adjusting the ratio Hc2/Hc1 may be used alone or two or more of them may be used in combination.

The ratio Hrp/Hc1 can be controlled by, for example, adjusting the orientation condition in the magnetic field orientation processing and/or adjusting the coercive force of the magnetic powder. Further, the ratio Hrp/Hc1 can also be adjusted by changing the type of the magnetic powder, the average particle volume, average aspect ratio, or average particle size of the magnetic powder.

After that, the obtained magnetic recording medium 10 is wound around the large-diameter core, and the curing processing is performed thereon. Finally, the magnetic recording medium 10 is calendered and cut into a predetermined width (e.g., ½ inch width). In this way, a desired long elongated magnetic recording medium 10 can be obtained.

(3) Recording/Reproduction Apparatus

[Configuration of Recording/Reproduction Apparatus]

Next, an example of a configuration of a recording/reproduction apparatus 30 for recording and reproducing the magnetic recording medium 10 having the above-mentioned configuration will be described with reference to FIG. 9.

The recording/reproduction apparatus 30 has a configuration capable of adjusting the tension applied to the longitudinal direction of the magnetic recording medium 10. Further, the recording/reproduction apparatus 30 has a configuration in which a magnetic recording cartridge 10A can be loaded. Now, the case where for ease of description, the recording/reproduction apparatus 30 has a configuration in which a single magnetic recording cartridge 10A can be loaded will be described. However, the recording/reproduction apparatus 30 may have a configuration in which a plurality of magnetic recording cartridge 10A can be loaded.

The recording/reproduction apparatus 30 is connected via a network 43 to an information processing apparatus such as a server 41 and a personal computer (hereinafter, referred to as "PC") 42, and is configured to be capable of recording data supplied from these information processing apparatuses on the magnetic recording cartridge 10A. The shortest recording wavelength of the recording/reproduction apparatus 30 is favorably 100 nm or less, more favorably 75 nm or less, still more favorably 60 nm or less, and particularly favorably 50 nm or less.

Figure 9:
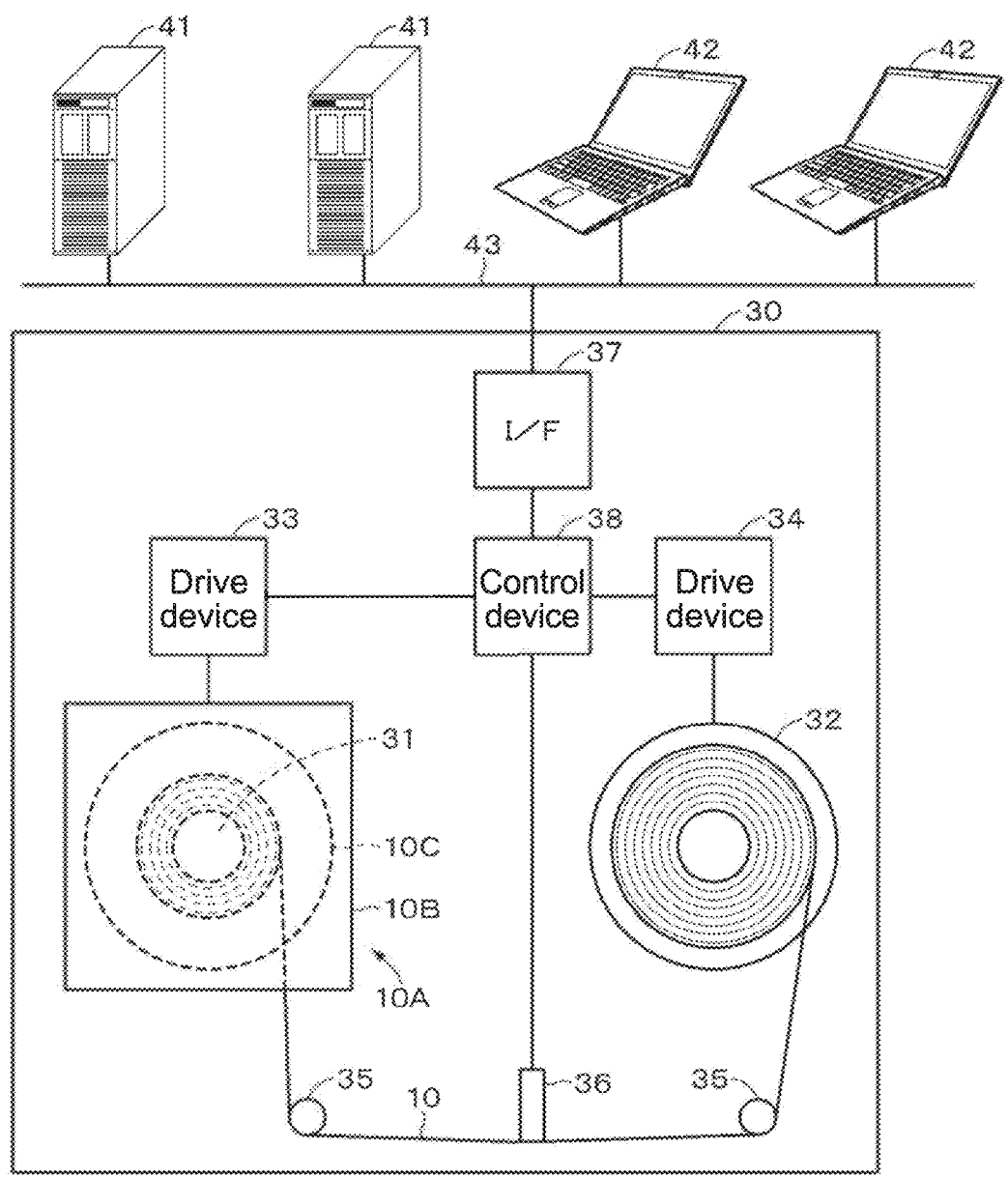
FIG. 9 is a schematic diagram of a recording/reproduction apparatus.

As shown in FIG. 9, the recording/reproduction apparatus 30 includes a spindle 31, a reel 32 on the side of the recording/reproduction apparatus, a spindle drive device 33, a reel drive device 34, a plurality of guide rollers 35, a head unit 36, a communication interface (hereinafter, I/F) 37, and a control device 38.

The spindle 31 is configured to be capable of loading the magnetic recording cartridge 10A. The magnetic recording cartridge 10A conforms to the LTO (Linear Tape Open) standard and rotatably houses, in a cartridge case 10B, a single reel 10C on which the magnetic recording medium 10 is wound. A servo pattern of the inverted V shape is recorded on the magnetic recording medium 10 in advance as a servo signal. The reel 32 is configured to be capable of fixing the distal end of the magnetic recording medium 10 pulled out from the magnetic recording cartridge 10A.

The spindle drive device 33 is a device that rotationally drives the spindle 31. The reel drive device 34 is a device that rotationally drives the reel 32. When recording or reproducing data on or from the magnetic recording medium 10, the spindle drive device 33 and the reel drive device 34 rotationally drive the spindle 31 and the reel 32, respectively, to drive the magnetic recording medium 10. The guide roller 35 is a roller for guiding the traveling of the magnetic recording medium 10.

The head unit 36 includes a plurality of recording heads for recording data signals on the magnetic recording medium 10, a plurality of reproduction heads for reproducing data signals recorded on the magnetic recording medium 10, and a plurality of servo heads for reproducing the servo signal recorded on the magnetic recording medium 10. As the recording head, for example, a ring-type head can be used, but the type of the recording head is not limited thereto.

The communication I/F 37 is for communicating with an information processing apparatus such as the server 41 and the PC 42 and is connected to the network 43.

The control device 38 controls the entire recording/reproduction apparatus 30. For example, the control device 38 records data signals supplied from the information processing apparatus on the magnetic recording medium 10 by the head unit 36 in response to a request from the information processing apparatus such as the server 41 and the PC 42. Further, the control device 38 reproduces the data signal recorded on the magnetic recording medium 10 and supplies the reproduced data signal to the information processing apparatus by the head unit 36 in response to a request from the information processing apparatus such as the server 41 and the PC 42.

[Operation of Recording/Reproduction Apparatus]

Next, the operation of the recording/reproduction apparatus 30 having the above-mentioned configuration will be described.

First, the magnetic recording cartridge 10A is loaded into the recording/reproduction apparatus 30, and the distal end of the magnetic recording medium 10 is pulled out, transferred to the reel 32 via the plurality of guide rollers 35 and the head unit 36, and attached to the reel 32.

Next, when an operation unit (not shown) is operated, the spindle drive device 33 and the reel drive device 34 are driven under the control of the control device 38, and the spindle 31 and the reel 32 are caused to rotate in the same direction so that the magnetic recording medium 10 travels from the reel 10C to the reel 32. As a result, while the magnetic recording medium 10 is wound on the reel 32, information is recorded on the magnetic recording medium 10 or information recorded on the magnetic recording medium 10 is reproduced by the head unit 36.

Further, in the case where the magnetic recording medium 10 is rewound to the reel 10C, the spindle 31 and the reel 32 are rotationally driven in the direction opposite to the above-mentioned direction, thereby causing the magnetic recording medium 10 to travel from the reel 32 to the reel 10C. Also in this rewinding, information is recorded on the magnetic recording medium 10 or information recorded on the magnetic recording medium 10 is reproduced by the head unit 36.

(4) Cartridge

[Configuration of Cartridge]

The present disclosure also provides a magnetic recording cartridge (referred to also as a tape cartridge) including the magnetic recording medium according to the present disclosure. In the magnetic recording cartridge, the magnetic recording medium may be wound on a reel, for example. The magnetic recording cartridge may include, for example, a communication unit that communicates with a recording/reproduction apparatus, a storage unit, and a control unit that stores, in the storage unit, the information received from the recording/reproduction apparatus via the communication unit, and reads the information from the storage unit and transmits the read information to the recording/reproduction apparatus via the communication unit in response to a request from the recording/reproduction apparatus. The information may include adjustment information for adjusting tension applied to the magnetic recording medium in the longitudinal direction. The adjustment information may include, for example, information regarding the dimension in the width direction at a plurality of positions of the magnetic recording medium in the longitudinal direction. The information regarding the dimension in the width direction may be dimensional information at the time of production (initial after production) of the magnetic recording medium described below in the [Configuration of cartridge memory] and/or dimensional information acquired in the recording and/or reproduction processing of the magnetic recording medium.

An example of a configuration of the cartridge 10A including the magnetic recording medium 10 having the above-mentioned configuration will be described with reference to FIG. 10.

Figure 10:
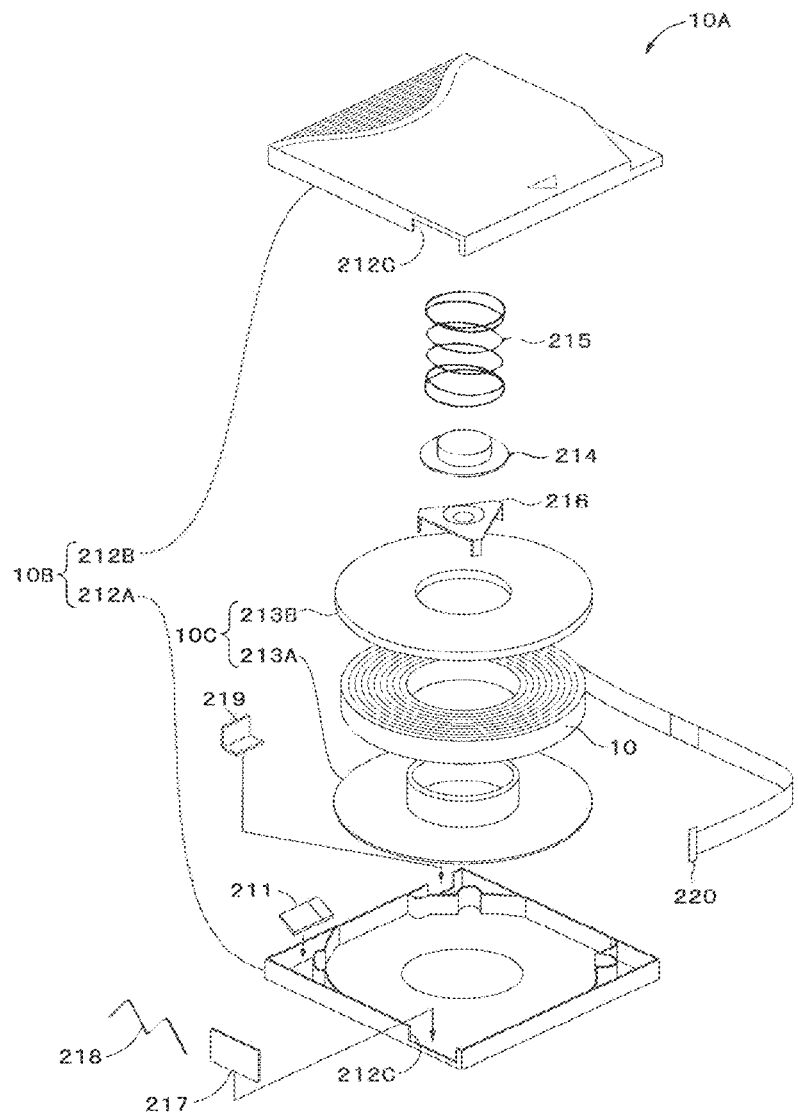
FIG. 10 is an exploded perspective view showing an example of a configuration of a cartridge.

FIG. 10 is an exploded perspective view showing an example of a configuration of the cartridge 10A. The cartridge 10A is a magnetic recording medium cartridge conforming to the LTO (Linear Tape-Open) standard, and includes, inside the cartridge case 10B including a lower shell 212A and an upper shell 212B, the reel 10C on which the magnetic tape (tape-shaped magnetic recording medium) 10 is wound, a reel lock 214 and a reel spring 215 for locking rotation of the reel 10C, a spider 216 for releasing the locked state of the reel 10C, a slide door 217 for opening and closing a tape outlet 212C provided on the cartridge case 10B across the lower shell 212A and the upper shell 212B, a door spring 218 that biases the slide door 217 to the closed position of the tape outlet 212C, a write protect 219 for preventing erroneous erasure, and a cartridge memory 211. The reel 10C has a substantially disk shape having an opening at its center, and includes a reel hub 213A and a flange 213B formed of a hard material such as plastics. A leader pin 220 is provided at one end of the magnetic tape 10.

The cartridge memory 211 is provided in the vicinity of one corner of the cartridge 10A. While the cartridge 10A is loaded into the recording/reproduction apparatus 30, the cartridge memory 211 is caused to face a reader/writer (not shown) of the recording/reproduction apparatus 30. The cartridge memory 211 communicates with the recording/reproduction apparatus 30, specifically, a reader/writer (not shown), using a radio communication standard conforming to the LTO standard.

[Configuration of Cartridge Memory]

An example of a configuration of the cartridge memory 211 will be described with reference to FIG. 11.

Figure 11:
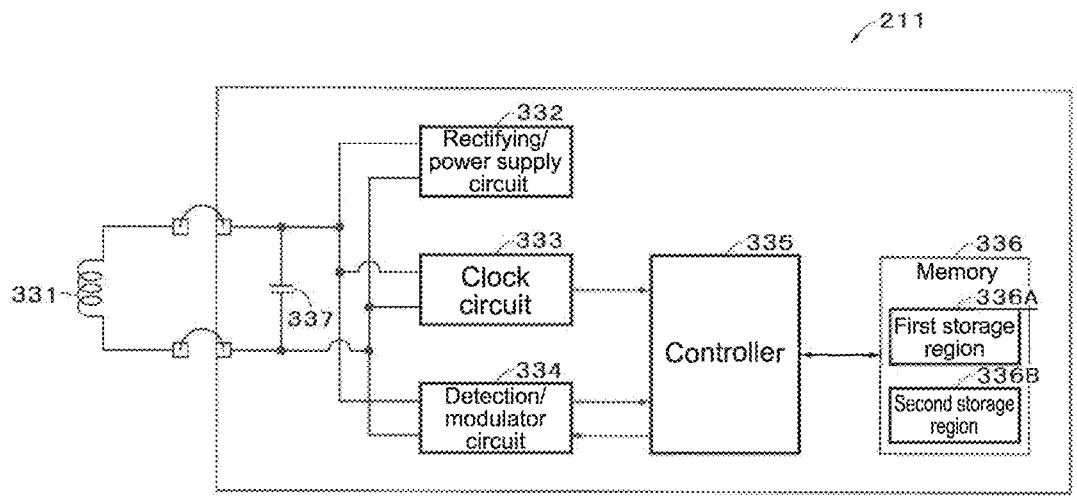
FIG. 11 is a block diagram showing an example of a configuration of a cartridge memory.

FIG. 11 is a block diagram showing an example of a configuration of the cartridge memory 211. The cartridge memory 211 includes an antenna coil (communication unit) 331 for communicating with a reader/writer (not shown) in a defined communication standard, a rectifying/power supply circuit 332 that generates and rectifies power from radio waves received by the antenna coil 331 using induced electromotive force to generate a power source, a clock circuit 333 that generates clocks using induced electromotive force similarly from radio waves received by the antenna coil 331, a detection/modulator circuit 334 for detecting radio waves received by the antenna coil 331 and modulating signals transmitted by the antenna coil 331, a controller (control unit) 335 including a logical circuit and the like for discriminating commands and data from digital signals extracted from the detection/modulator circuit 334 and processing the commands and data, and a memory (storage unit) 336 that stores information. Further, the cartridge memory 211 includes a capacitor 337 connected in parallel to the antenna coil 331, and the antenna coil 331 and the capacitor 337 constitute a resonant circuit.

The memory 336 stores information and the like relating to the cartridge 10A. The memory 336 is a non-volatile memory (NVM). The storage capacity of the memory 336 is favorably approximately 32 KB or more. For example, in the case where the cartridge 10A is compliant with the LTO-9 or LTO-10 standard, the memory 336 has a storage capacity of approximately 32 KB.

The memory 336 has a first storage region 336A and a second storage region 336B. The first storage region 336A corresponds to a storage region of a cartridge memory of the LTO standard before LTO8 (hereinafter, referred to as "existing cartridge memory".), and is a region for storing information conforming to the LTO standard before LTO8. The information conforming to the LTO standard before LTO8 includes, for example, production information (e.g., a unique number of the cartridge 10A), a use history (e.g., the number of times of tape drawing (Thread Count)), and the like.

The second storage region 336B corresponds to an extended storage region for the storage region of the existing cartridge memory. The second storage region 336B is a region for storing additional information. Here, the additional information means information relating to the cartridge 10A, which is not specified in the LTO standard before LTO8. Examples of the additional information include, but not limited to, tension adjustment information, management ledger data, Index information, and thumbnail information of a moving image stored in the magnetic tape 10. The tensioning adjustment information includes a distance between adjacent servo bands at the time of recording data on the magnetic tape 10 (distance between servo patterns recorded on adjacent servo bands). The distance between adjacent servo bands is an example of the width-related information relating to the width of the magnetic tape 10. The details of the distance between servo bands will be described below. In the following description, the information stored in the first storage region 336A is referred to as "first information", and the information stored in the second storage region 336B is referred to as "second information" in some cases.

The memory 336 may include a plurality of banks. In this case, the first storage region 336A may be configured by some of the plurality of banks, and the second storage region 336B may be configured by the remaining banks. Specifically, for example, in the case where the cartridge 10A conforms to the LTO-9 standard or LTO-10 standard, the memory 336 may include two banks having storage capacities of approximately 16 KB, one bank of the two banks may constitute the first storage region 336A, and the other bank may constitute the second storage region 336B.

The antenna coil 331 induces an induced voltage by electromagnetic induction. The controller 335 communicates with the recording/reproduction apparatus 30 in accordance with a defined communication standard via the antenna coil 331. Specifically, for example, mutual authentication, transmission and reception of commands, exchanging data, and the like are performed.

The controller 335 stores information received from the recording/reproduction apparatus 30 via the antenna coil 331 in the memory 336. The controller 335 reads information from the memory 336 and transmits it to the recording/reproduction apparatus 30 via the antenna coil 331 in response to a request from the recording/reproduction apparatus 30.

(5) Effects

In the magnetic recording medium 10, the average particle volume V of the magnetic powder contained in the magnetic layer 13 is 2,000 nm$^3$ or less, the average thickness $t_T$ of the magnetic recording medium 10 is 5.3 μm or less, the thermal stability $K_u V_{act}/k_B T$ of the magnetic recording medium 10 is 60 or more, and the ratio Hrp/Hc1 of the residual coercive force Hrp of the magnetic recording medium 10 measured using a pulsed magnetic field and the coercive force Hc1 of the magnetic recording medium 10 in the perpendicular direction is 2.10 or less. As a result, the magnetic recording medium 10 has high recording density and is excellent in preservation stability. In addition, the magnetic recording medium 10 is also excellent in electromagnetic conversion characteristics.

(6) Modified Example

Modified Example 1

Figure 12:
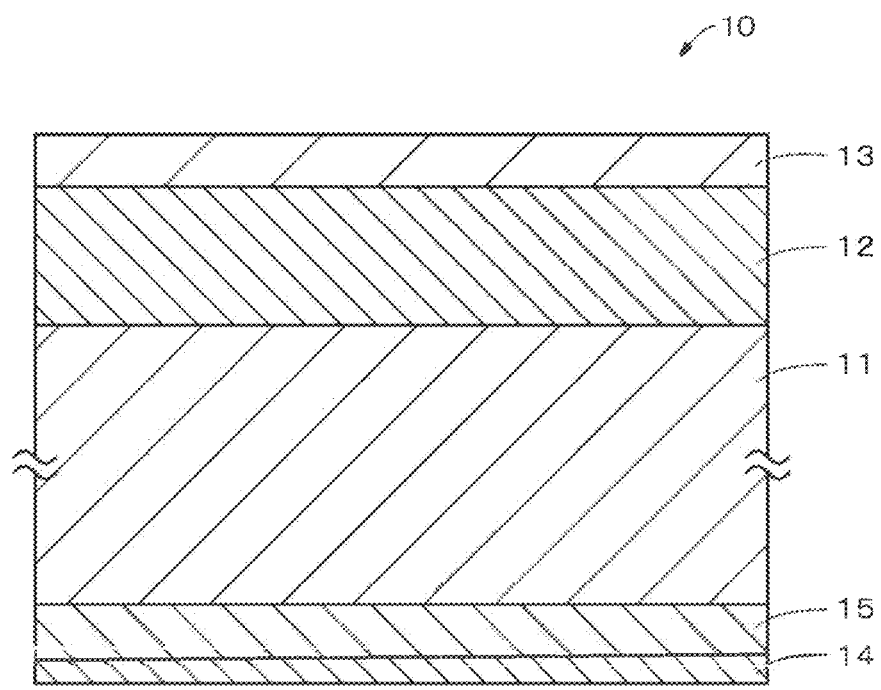
FIG. 12 is a schematic diagram showing a cross section of a magnetic recording medium according to a modified example.

As shown in FIG. 12, the magnetic recording medium 10 may further include a barrier layer 15 provided on at least one surface of the base 11. The barrier layer 15 is a layer for suppressing a dimensional change according to the environments of the base 11. For example, as an example of a reason for causing the dimensional change, there is a hygroscopicity of the base 11, but it is possible to reduce the speed of intrusion of moisture into the base 11 by providing the barrier layer 15. The barrier layer 15 includes, for example, a metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta can be used. As the metal oxide, for example, a metal oxide containing one or two or more of the above-mentioned metals can be used. More specifically, for example, at least one of $Al_2O_3$, CuO, CoO, $SiO_2$, $Cr_2O_3$, $TiO_2$, $Ta_2O_5$, or $ZrO_2$ can be used. Further, the barrier layer 15 may contain diamond-like carbon (DLC), diamond, or the like.

The average thickness of the barrier layer 15 is favorably 20 nm or more and 1,000 nm or less, and more favorably 50 nm or more and 1,000 nm or less. The average thickness of the barrier layer 15 is obtained in the same manner as in the average thickness of the magnetic layer 13. However, the magnification of the TEM image is appropriately adjusted in accordance with the thickness of the barrier layer 15.

Modified Example 2

The magnetic recording medium 10 may be incorporated into a library device. That is, the present disclosure also provides a library device including at least one magnetic recording medium 10. The library device has a configuration capable of adjusting the tension applied to the longitudinal direction of the magnetic recording medium 10, and may include a plurality of the recording/reproduction apparatuses 30 described above.

3. Example

Hereinafter, the present disclosure will be specifically described by way of Examples, but the present disclosure is not limited to only these Examples.

In this Example, the average thickness of the base film (base), the average thickness of the magnetic layer, the average thickness of the underlayer, the average thickness of the back layer, the average thickness of the magnetic tape (magnetic recording medium), the average aspect ratio of the magnetic powder, the average particle size of the magnetic powder, the average particle volume of the magnetic powder, the coercive force Hc1 of the tape-like magnetic recording medium (referred to also as the "magnetic tape") in the perpendicular direction, the residual coercive force Hrp, and the thermal stability $K_u V_{act}/k_B T$ (measured at 25° C.) are those obtained by the measurement method described in the above-mentioned embodiment.

Example 1

(Process of Preparing Coating Material for Forming Magnetic Layer)

A coating material for forming a magnetic layer was prepared as follows. First, a first composition of the following formulation was kneaded with an extruder. Next, the kneaded first composition and a second composition of the following formulation were added to a stirring tank including a dispersion device to perform preliminary mixing. Subsequently, sand mill mixing was further performed, and filter treatment was performed to prepare a coating material for forming a magnetic layer.

(First Composition)
Magnetic powder (hexagonal ferrite having an M-type structure, composition: Ba-Ferrite, average particle volume: 1,600 $nm^3$): 100 parts by mass
Vinyl chloride resin (30% by mass of cyclohexanone solution): 60 parts by mass
(The degree of polymerization 300, Mn=10,000, containing $OSO_3K$=0.07 mmol/g and secondary OH=0.3 mmol/g as polar groups.)
(Aluminum oxide powder: 5 parts by mass
($\alpha$-$Al_2O_3$, average particle diameter 0.2 μm)
Carbon black: 2 parts by mass
(Manufactured by Tokai Carbon Co., Ltd., trade name: Seast TA)
(Second Composition)
Vinyl chloride resin: 1.1 parts by mass
(Resin solution: resin content 30% by mass, cyclohexanone 70% by mass)
N-butyl stearate: 2
Methyl ethyl ketone: 121.3 parts by mass
Toluene: 121.3 parts by mass
Cyclohexanone: 60.7 parts by mass
Finally, as curing agents, polyisocyanate (trade name: coronate L, manufactured by Nippon Polyurethane Industry Co., Ltd.): 2 parts by mass and myristic acid: 2 parts by mass were added to the coating material for forming a magnetic layer prepared as described above.

(Process of Preparing Coating Material for Forming Underlayer)

A coating material for forming an underlayer was prepared as follows. First, a third composition of the following formulation was kneaded with an extruder. Next, the kneaded third composition and a fourth composition of the following formulation were added to a stirring tank including a dispersion device to perform preliminary mixing. Subsequently, sand mill mixing was further performed, and filter treatment was performed to prepare a coating material for forming an underlayer.

(Third Composition)
Acicular iron oxide powder: 100 parts by mass
($\alpha$-$Fe_2O_3$, average major axis length 0.15 μm)
Vinyl chloride resin: 55.6 parts by mass
(Resin solution: resin content 30% by mass, cyclohexanone 70% by mass)
Carbon black: 10 parts by mass
(Average particle size 20 nm)
(Fourth Composition)
Polyurethane resin UR8200 (manufactured by TOYOBO CO., LTD.): 18.5 parts by mass
N-butyl stearate: 2 parts by mass
Methyl ethyl ketone: 108.2 parts by mass
Toluene: 108.2 parts by mass
Cyclohexanone: 18.5 parts by mass Finally, as curing agents, polyisocyanate (trade name: coronate L, manufactured by TOSOH CORPORATION): 2 parts by mass and myristic acid: 2 parts by mass were added to the coating material for forming an underlayer prepared as described above.

(Process of Preparing Coating Material for Forming Back Layer)

A coating material for forming a back layer was prepared as follows. A coating material for forming a back layer was prepared by mixing the following raw materials in a stirring tank including a dispersion device and performing filter treatment thereon.

Carbon black (manufactured by ASAHI CARBON CO., LTD., trade name: #80): 100 mass part
Polyester polyurethane: 100 parts by mass
(manufactured by Nippon Polyurethane Industry Co., Ltd., product name: N-2304)
Methyl ethyl ketone: 500 parts by mass
Toluene: 400 parts by mass
Cyclohexanone: 100 parts by mass
Polyisocyanate (trade name: coronate L, manufactured by TOSOH CORPORATION): 10 parts by mass (Deposition Process)

Using the coating material prepared as described above, a magnetic tape having a medium configuration as shown in Table 1 below was prepared as described below.

First, as a support, a PEN film (base film) having an elongated shape and an average thickness of 4.0 μm was prepared. Next, a coating material for forming an underlayer was applied on one main surface of the PEN film and dried to form an underlayer having an average thickness of 0.9 μm on one main surface of the PEN film. Next, a coating material for forming a magnetic layer was applied on the underlayer and dried to form a magnetic layer having an average thickness of 80 nm on the underlayer. Note that when the coating material for forming a magnetic layer was dried, the magnetic field of the magnetic powder is oriented in the thickness direction of the PEN film by a solenoid coil. Specifically, the magnetic field of the magnetic powder was once oriented in the traveling direction (longitudinal direction) of the PEN film by the solenoid coil, and then oriented in the thickness direction of the PEN film. Further, the drying conditions (drying temperature and drying time) of the coating material for forming a magnetic layer were adjusted, and the coercive force Hc1 in the perpendicular direction was set as shown in Table 2.

Subsequently, a back layer having an average thickness of 0.3 μm was formed by applying a coating material for forming a back layer on the other main surface of the PEN film on which the underlayer and the magnetic layer were formed and drying them. Then, the PEN film on which the underlayer, the magnetic layer, and the back layer were formed was cured. After that, calendering was performed thereon to smooth the surface of the magnetic layer.

(Cutting Process)

The magnetic tape obtained as described above was cut into a ½ inch (12.65 mm) width. As a result, a magnetic tape that has an elongated shape and an average thickness of 5.3 μm was obtained. As shown in Table 2, regarding the obtained magnetic tape, the thermal stability $K_u V_{act}/k_B T$ was 77 and the ratio Hrp/Hc1 of the residual coercive force Hrp to the coercive force Hc1 of the magnetic recording medium in the perpendicular direction was 1.78.

(Writing of Servo Signal and Data Signal)

A servo signal and a data signal were written to the elongated magnetic tape obtained as described above in the following manner. First, five servo bands having the servo band width $W_{SB}$ of 96 μm were formed by writing a servo signal to the magnetic tape using a servo writer. Note that by the writing of servo signals, columns of magnetic patterns of the inverted V shape were formed on the servo bands.

Next, a data signal was written to the data band between servo bands using a recording/reproduction apparatus. At this time, the recording/reproduction apparatus was controlled so that the recording track width W was 2.9 μm and the recording wavelength λ was a single recording wavelength of 0.208 μm. Note that the recording wavelength λ [nm] of the data signal was four times the minimum value L [nm] (=0.052 μm) of the magnetization reversal distance when recorded at the shortest recording wavelength (i.e., the shortest recording wavelength L'=2×L, the recording wavelength λ=(twice the length of L')). A ring head having a gap length of 0.2 μm was used as the recording head.

Here, the reason why the recording wavelength λ is twice the shortest recording wavelength L' is as follows. That is, in the recording and reproduction system using a short wavelength, generally, the ratio of the output/noise when recorded and reproduced at the recording wavelength twice the shortest recording wavelength is often used as the SNR. Further, the SNR at twice the recording wavelength is more correlated with the error rate than SNR at the shortest recording wavelength. Further, in the case where the SNR measurement is performed at the shortest recording wavelength, the tape noise is hidden in the system noise of the recording and reproduction system depending on the wavelength characteristics of the recording and reproduction system, and the noise characteristics of the medium is not correctly reflected in some cases. In particular, in the case of high line recording density recording, the noise characteristics of the medium are often not reflected correctly.

Figure 13:
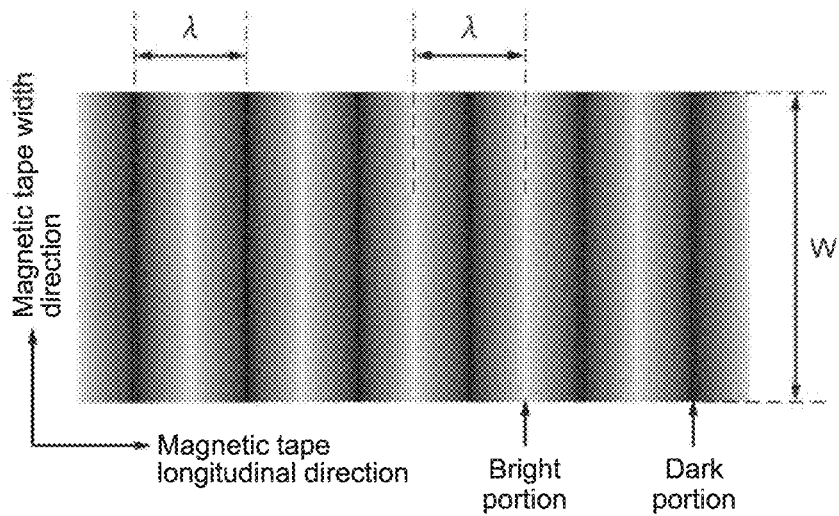
FIG. 13 Part A of FIG. 13 shows an MFM image in the case where a data signal is recorded at a wavelength λ. Part B of FIG. 13 shows an MFM image in the case where a data signal is recorded at the shortest recording wavelength L'.
Figure 13:
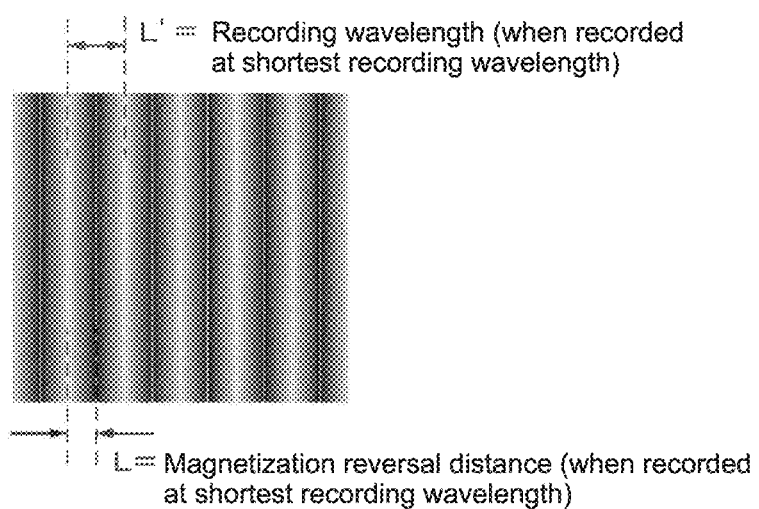

The minimum value L of the magnetization reversal distance and the data track width W were obtained as follows. First, the surface of the magnetic layer 13 was observed using a magnetic force microscope (MFM) to acquire an MFM image. Part A and Part B of FIG. 13 each show an example of the MFM image. Next, the dimension of the magnetization pattern column in the width direction of the magnetic tape was measured from the acquired MFM

TABLE 1

| Medium configuration | average thickness of a magnetic tape [μm] | average thickness of a magnetic layer [nm] | average thickness of an underlayer [μm] | average thickness of a base film [μm] | average thickness of a back layer [μm] | Number of servo tracks | W/L | W [μm] | L [μm] |
|---|---|---|---|---|---|---|---|---|---|
| magnetic layer/underlayer/base film/back layer | 5.3 | 80 | 0.9 | 4.0 | 0.3 | 5 | 50 | 2.9 | 0.052 | image, and used as the track width W [nm]. Further, the distance between a bright portion and a bright portion in the longitudinal direction of the magnetic tape or the distance between a dark portion and a dark portion was defines as λ [nm]. After that, the value of half of λ [nm] was defined as L' [nm], and the value of half of L' [nm] was defined as L [nm].

Example 2

A magnetic tape was obtained in the same manner as that in Example 1 except that the magnetic tape was produced with no-orientation (i.e., the above-mentioned magnetic field orientation by the solenoid coil is not performed; the same applies hereinafter.). The obtained magnetic tape had the coercive force He 1, the residual coercive force Hrp, and the thermal stability $K_u V_{act}/k_B T$ as shown in Table 2.

Example 3

A magnetic tape was obtained in the same manner as that in Example 1 except that the average particle volume of the magnetic powder was further refined to 1,200 nm$^3$ and the magnetic tape was produced with no-orientation. The obtained magnetic tape had the coercive force Hc1, the residual coercive force Hrp, and the thermal stability $K_u V_{act}/k_B T$ as shown in Table 2.

Example 4

A magnetic tape was obtained in the same manner as that in Example 1 except that the magnetic powder used in Example 3 was used. The obtained magnetic tape had the coercive force Hc1, the residual coercive force Hrp, and the thermal stability $K_u V_{act}/k_B T$ as shown in Table 2.

Comparative Example 1

A magnetic tape was obtained in the same manner as that in Example 1 except that a magnetic powder having the average particle volume of 2,500 nm$^3$ was used and the magnetic tape was produced with no-orientation. The obtained magnetic tape had the coercive force Hc1, the residual coercive force Hrp, and the thermal stability $K_u V_{act}/k_B T$ as shown in Table 2.

Comparative Example 2

A magnetic tape was obtained in the same manner as that in Example 1 except that a magnetic powder having a lower Hc1 was used and the magnetic tape was produced with no-orientation. The obtained magnetic tape had the coercive force Hc1, the residual coercive force Hrp, and the thermal stability $K_u V_{act}/k_B T$ as shown in Table 2.

The signal attenuation amount SD and the electromagnetic conversion characteristics (SNR) were evaluated for the magnetic tapes according to Examples 1 to 4 and Comparative Examples 1 and 2 obtained as described above. These evaluation methods are described below.

(Signal Attenuation Amount SD after 100 s)

For the samples in Examples and Comparative Examples, the signal attenuation amount SD after the lapse of 100 s was obtained as follows. Specifically, a "Tape Head Tester (hereinafter, referred to as THTs)" manufactured by MicroPhysics, Inc. was used. As the recording/reproduction head, the one mounted on the tape drive "TS1140" manufactured by IBM Corporation was used as it is. At the time of measurement, a magnetic tape as a magnetic recording medium was cut into a length of 90 cm to form a ring so that the recording layer of the magnetic tape was on the back side, and then both ends of the magnetic tape were bonded to each other by an adhesive tape on the back surface of the magnetic tape. Further, a silver tape for detecting the tape circumference position was attached adjacent to the bonded portion. The ring-shaped magnetic tape was attached to the THT and then circulated at a rate of 2 m/sec.

Then, the signal of 10 MHz generated using the signal generator "ARBITRARY WAVEFORM GENERATOR AWG2021" manufactured by TEKTRONIX, INC. was recorded by the amount corresponding to only one lap of the tape total length by using the optimal recording current for the magnetic tape. Following the recording, the signals recorded on the tape were continuously reproduced from the next cycle, and the reproduction output was measured by a spectrum analyzer "8591E2 manufactured by Hewlett-Packard Company.

Note that the setting of the spectrum analyzer at this time was as follows: RBW: 1 MHz, VBW: 1 MHz, SWP: 500 msec, point: 400, and a zero-span mode. The measurement was performed for only 0.4 sec on the "recording portion" except for the "vicinity of the tape bonded portion" where sufficient recording was not performed, and the average value Y of the reproduction output during this period was calculated. The measurement was performed for each lap of the tape, and the average value Y of the reproduced output in each lap was used as the reproduction output average value Y (t) in the elapsed time from the signal recording end (t=0). The measurement was performed until t=100 sec, and was timely transmitted to the connected personal computer and recorded.

The above-mentioned measurement flow was performed four times using the same magnetic tape, and the Y(t) values obtained by the respective measurements were averaged for the same elapsed time t to obtain a numerical sequence of $Y_{ave}(t)$. The obtained $Y_{ave}(t)$ and the elapsed time t were respectively plotted on the Y-axis and the X-axis in a graph, and an approximate curve was created using a logarithmic approximation from this graph. The obtained approximate curve was used to calculate the signal attenuation amount SD after 100 s. The calculation results are shown in Table 2 below.

(SNR in 25° C. Environment)

Using a ½-inch tape traveling device (MTS Transport manufactured by Mountain Engineering II) to which a recording/reproduction head and a recording/reproduction amplifier are attached, the SNR (electromagnetic conversion characteristics) of the magnetic tape in a 25° C. environment was measured. A ring head having a gap length of 0.2 μm was used as a recording head, and a GMR head having a distance between shields of 0.1 μm was used as a reproduction head. The relative velocity was set to 6 m/s and the recording clock frequency was set to 160 MHz.

Further, the SNR was calculated on the basis of the method described in the following literature (measurement method using a spectrum analyzer). The results are shown in Table 2 below in terms of relative values with the SNR in Comparative Example 1 as 0 dB.

Y. Okazaki: "An Error Rate Emulation System.", IEEE Trans. Man., 31, pp. 3093-3095(1995)

Table 2 below shows the results of evaluating the magnetic tapes according to Examples 1 to 4 and Comparative Examples 1 and 2.

TABLE 2

| | Example 1 | Example 2 | Example 3 | Example 4 | Comparative Example 1 | Comparative Example 2 |
|---|---|---|---|---|---|---|
| average particle volume of the magnetic powder V(nm³) | 1600 | 1600 | 1200 | 1200 | 2500 | 1600 |
| Hc1(Oe) | 2620 | 2460 | 2470 | 2450 | 2810 | 2150 |
| $K_u V_{act}/k_B T$ | 77 | 63 | 65 | 75 | 73 | 56 |
| Hrp/Hc1 | 1.78 | 1.89 | 1.98 | 1.94 | 1.70 | 2.25 |
| SNR(dB) | 1.0 | 0.6 | 0.7 | 1.2 | 0.0 | −2.2 |
| signal attenuation amount (dh/100 s) | −0.05 | −0.16 | −0.14 | −0.06 | −0.07 | −0.60 |

From Table 2, the following can be seen.

All of the magnetic tapes according to Examples 1 to 4 had the signal-attenuation amount SD after 100 seconds less than −0.30 dB, even though the average particle volume of the magnetic powder was 2,000 nm³ or less. For this reason, all of the magnetic tapes according to Examples 1 to 4 were excellent in preservation stability even though the average particle volume of the magnetic powder was small. In addition, all of the magnetic tapes according to Examples 1 to 4 had the SNR of 0.5 dB or more and excellent electromagnetic conversion characteristics. From these results, it can be seen that the magnetic recording medium according to the present disclosure is excellent in preservation stability and further excellent in electromagnetic conversion characteristics even though the average particle volume of the magnetic powder is small.

The magnetic tapes according to Examples 3 and 4 are excellent in preservation stability and electromagnetic conversion characteristics even though they contain the magnetic powder having an average particle volume smaller than that of the magnetic tape according to Examples 1 and 2. In addition, the magnetic tape according to Example 4 is more excellent in preservation stability and electromagnetic conversion characteristics than the magnetic tape according to Example 3. For this reason, it can be seen that the effects of the present disclosure are also achieved in the case of containing a magnetic powder having a small average particle volume (e.g., 1500 nm³ or less) as in Examples 3 and 4. Therefore, in accordance with the present disclosure, it is possible to improve the recording density in addition to preservation stability and electromagnetic conversion characteristics.

It can be seen from the comparison between Comparative Examples 1 and 2 that the signal attenuation amount SD increases as the average particle volume of the magnetic powder decreases. Then, it can be seen from the comparison between Comparative Example 2 and Examples 1 and 2 that the signal attenuation amount SD can be reduced by setting Hrp/Hc1 to, for example, 2.10 or less, particularly 2.05 or less, and more particularly 2.00 or less even if the average particle volume of the magnetic powder is similarly low. Further, it is considered that the thermal stability $K_u V_{act}/k_B T$ of 60 or more contributes to the reduction in the signal attenuation amount SD.

Further, it can also be seen from the comparison between Comparative Example 2 and Examples 1 and 2 that the SNR is improved by setting Hrp/Hc1 to, for example, 2.10 or less, particularly 2.05 or less, and more particularly 2.00 or less.

Further, it is also considered that the thermal stability $K_u V_{act}/k_B T$ of 60 or more contributes to improvement of the SNR. As can be seen from the results of Examples 3 and 4, this improvement can also be seen in the case where the average particle volume of the magnetic powder is small (e.g., 1,500 nm³ or less).

From Examples 1 to 4, it can be seen that even in the case where the average particle volume of the magnetic powder is set to a smaller value (e.g., 1500 nm³ or less), the signal attenuation amount SD can be reduced by setting Hrp/Hc1 to, for example, 2.10 or less, particularly, 2.05 or less, and more particularly, 2.00 or less. Further, it is considered that the thermal stability $K_u V_{act}/k_B T$ of 60 or more contributes to the reduction in the signal attenuation amount SD.

While embodiments of the present disclosure and Examples have been specifically described above, the present disclosure is not limited to the above-described embodiments and Examples, and various modifications based on the technical idea of the present disclosure can be made.

For example, the configurations, methods, processes, shapes, materials, numerical values, and the like described in the above-mentioned embodiments and Examples are merely examples, and other configurations, methods, processes, shapes, materials, numerical values, and the like may be used as necessary. In addition, the chemical formulae of compounds and the like are representative ones, and the valences and the like are not limited as long as they represent common names of the same compound.

The above-mentioned configurations, methods, processes, shapes, materials, numerical values, and the like in the embodiments and Examples can be combined with each other without departing from the essence of the present disclosure.

Further, in the present specification, the numerical range indicated by using "to" indicates a range including numerical values described before and after "to" as a minimum value and a maximum value, respectively. In the numerical range described in the present specification in a stepwise manner, the upper limit value or the lower limit value of the numerical range at one step may be replaced by the upper limit value or the lower limit value of the numerical range at another step. Unless otherwise specified, one of the materials exemplified in the present specification can be used alone, or two or more of them can be used in combination.

It should be noted that the present disclosure may also take the following configurations.

[1] A tape-shaped magnetic recording medium, including:
a base; and
a magnetic layer that is provided on the base and contains a magnetic powder, wherein
an average particle volume V of the magnetic powder is 2,000 nm³ or less,
an average thickness of the magnetic recording medium is 5.3 μm or less,
a thermal stability $K_u V_{act}/k_B T$ of the magnetic recording medium is 60 or more, and
a ratio Hrp/Hc1 of a residual coercive force Hrp of the magnetic recording medium measured using a pulsed magnetic field to a coercive force Hc1 of the magnetic recording medium in a perpendicular direction is 2.10 or less.

[2] The magnetic recording medium according to [1], in which
the average particle volume V of the magnetic powder is 1,800 nm³ or less.

[3] The magnetic recording medium according to [1], in which the average particle volume V of the magnetic powder is 1,600 nm³ or less.

[4] The magnetic recording medium according to any one of [1] to [3], in which the thermal stability $K_u V_{act}/k_B T$ is 63 or more.

[5] The magnetic recording medium according to any one of [1] to [3], in which the thermal stability $K_u V_{act}/k_B T$ is 65 or more.

[6] The magnetic recording medium according to any one of [1] to [5], in which the ratio Hrp/Hc1 is 2.05 or less.

[7] The magnetic recording medium according to any one of [1] to [5], in which the ratio Hrp/Hc1 is 2.00 or less.

[8] The magnetic recording medium according to any one of [1] to [7], in which the magnetic powder contains hexagonal ferrite.

[9] The magnetic recording medium according to [8], in which the hexagonal ferrite contains at least one of Ba, Sr, or Ca.

[10] The magnetic recording medium according to any one of [1] to [9], in which a signal attenuation amount SD of the magnetic recording medium at 100 seconds after recording satisfies the following relationship: −0.30 dB≤SD.

[11] The magnetic recording medium according to any one of [1] to [9], in which the signal attenuation amount SD of the magnetic recording medium at 100 seconds after recording satisfies the following relationship: −0.25 dB≤SD.

[12] The magnetic recording medium according to any one of [1] to [11], in which a thickness $t_m$ of the magnetic layer satisfies the following relationship: 30 nm≤$t_m$≤90 nm.

[13] The magnetic recording medium according to any one of [1] to [12], in which the coercive force Hc1 is 500 Oe or more.

[14] The magnetic recording medium according to any one of [1] to [13], in which an average thickness of the base is 4.2 μm or less.

[15] The magnetic recording medium according to any one of [1] to [14], in which an underlayer is provided between the magnetic layer and the base, and an average thickness of the underlayer is 2.0 μm or less.

[16] The magnetic recording medium according to any one of [1] to [15], in which of two surfaces of the base, a back layer is provided on a surface opposed to a surface on which the magnetic layer is provided, and an average thickness of the back layer is 0.6 μm or less.

[17] The magnetic recording medium according to any one of [1] to [16], in which an average particle size of the magnetic powder is 50 nm or less.

[18] A tape cartridge, including:

the tape-shaped magnetic recording medium according to any one of [1] to [17];

a communication unit that communicates with a recording/reproduction apparatus;

a storage unit; and a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, in which the information includes adjustment information for adjusting tension applied to the magnetic recording medium in a longitudinal direction.

REFERENCE SIGNS LIST

10 magnetic recording medium
11 base (base layer)
12 underlayer
13 magnetic layer
14 back layer

The invention claimed is:

1. A magnetic recording medium, comprising:
a base;
an underlayer that is provided over the base and includes a non-magnetic powder; and
a magnetic layer that is provided over the underlayer and includes a magnetic powder and a binder, wherein
an average particle volume V of the magnetic powder is 1600 nm3 or less,
an average thickness of the magnetic recording medium is 5.3 μm or less,
a thermal stability KuVact/kBT of the magnetic recording medium is 63 or more, and
a ratio Hrp/Hc1 of a residual coercive force Hrp of the magnetic recording medium measured using a pulsed magnetic field in a perpendicular direction to a coercive force Hc1 of the magnetic recording medium in the perpendicular direction is 1.98 or less.

2. The magnetic recording medium according to claim 1, wherein the magnetic powder contains hexagonal ferrite.

3. The magnetic recording medium according to claim 2, wherein the hexagonal ferrite contains at least one of Ba, Sr, or Ca.

4. The magnetic recording medium according to claim 1, wherein a signal attenuation amount SD of the magnetic recording medium at 100 seconds after recording satisfies the following relationship: −0.30 dB≤SD.

5. The magnetic recording medium according to claim 1, wherein the signal attenuation amount SD of the magnetic recording medium at 100 seconds after recording satisfies the following relationship: −0.25 dB≤SD.

6. The magnetic recording medium according to claim 1, wherein a thickness tm of the magnetic layer satisfies the following relationship: 30 nm≤tm≤90 nm.

7. The magnetic recording medium according to claim 1, wherein the coercive force Hc1 is 500 Oe or more.

8. The magnetic recording medium according to claim 1, wherein an average thickness of the base is 4.2 μm or less.

9. The magnetic recording medium according to claim 1, wherein an average thickness of the underlayer is 2.0 μm or less.

10. The magnetic recording medium according to claim 1, wherein of two surfaces of the base, a back layer is provided on a surface opposed to a surface on which the magnetic layer is provided, and an average thickness of the back layer is 0.6 μm or less.

11. The magnetic recording medium according to claim 1, wherein an average particle size of the magnetic powder is 50 nm or less.

12. A tape cartridge, comprising:
the magnetic recording medium according to claim 1;
a communication unit that communicates with a recording/reproduction apparatus;

a storage unit; and a control unit that stores, in the storage unit, information received from the recording/reproduction apparatus via the communication unit, and reads the information from the storage unit and transmits the read information to the recording/reproduction apparatus via the communication unit in response to a request from the recording/reproduction apparatus, wherein the information includes adjustment information for adjusting tension applied to the magnetic recording medium in a longitudinal direction.

13. The tape cartridge according to claim 12, wherein the magnetic powder contains hexagonal ferrite.

14. The tape cartridge according to claim 12, wherein a signal attenuation amount SD of the magnetic recording medium at 100 seconds after recording satisfies the following relationship: $-0.30 \text{ dB} \leq \text{SD}$.

15. The tape cartridge according to claim 12, wherein the signal attenuation amount SD of the magnetic recording medium at 100 seconds after recording satisfies the following relationship: $-0.25 \text{ dB} \leq \text{SD}$.

16. The tape cartridge according to claim 12, wherein a thickness tm of the magnetic layer satisfies the following relationship: $30 \text{ nm} \leq \text{tm} \leq 90 \text{ nm}$.

17. The tape cartridge according to claim 12, wherein the coercive force Hc1 is 500 Oe or more.

18. The tape cartridge according to claim 12, wherein an average thickness of the base is 4.2 μm or less.

19. The tape cartridge according to claim 12, wherein an average thickness of the underlayer is 2.0 μm or less.

20. The tape cartridge according to claim 12, wherein an average particle size of the magnetic powder is 50 nm or less.

* * * * *